(12) United States Patent
Ding et al.

(10) Patent No.: US 10,601,246 B2
(45) Date of Patent: Mar. 24, 2020

(54) POWER SUPPLY SYSTEM AND METHOD

(71) Applicant: Vertiv Tech Co., Ltd., Shenzhen (CN)

(72) Inventors: Qigang Ding, Guangdong (CN); Tong Ni, Guangdong (CN); Bo Cao, Guangdong (CN); Huajun Lv, Guangdong (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 124 days.

(21) Appl. No.: 15/507,082

(22) PCT Filed: Aug. 31, 2015

(86) PCT No.: PCT/CN2015/088525
§ 371 (c)(1),
(2) Date: Feb. 27, 2017

(87) PCT Pub. No.: WO2016/034086
PCT Pub. Date: Mar. 10, 2016

(65) Prior Publication Data
US 2017/0256984 A1 Sep. 7, 2017

(30) Foreign Application Priority Data

Sep. 28, 2014 (CN) .......................... 2014 1 0506085

(51) Int. Cl.
*H02J 9/08* (2006.01)
*H02J 1/14* (2006.01)
(Continued)

(52) U.S. Cl.
CPC ................. *H02J 9/08* (2013.01); *F01M 1/00* (2013.01); *F02B 63/04* (2013.01); *H02J 1/14* (2013.01);
(Continued)

(58) Field of Classification Search
CPC ...... H02J 9/08; H02J 1/14; H02J 9/061; H02J 9/066; H02J 2009/068; F01M 1/00; F02B 63/04
(Continued)

(56) References Cited

U.S. PATENT DOCUMENTS 5,260,605 A   11/1993 Barfield
6,134,124 A   10/2000 Jungreis et al.
(Continued)

FOREIGN PATENT DOCUMENTS

CN   201616596 U   10/2010
CN   102208830 A   10/2011
(Continued)

OTHER PUBLICATIONS

First Chinese Office Action regarding Application No. 201410506106.9 dated Aug. 28, 2017. English translation provided.
(Continued)

*Primary Examiner* — Carlos Amaya
(74) *Attorney, Agent, or Firm* — Harness, Dickey & Pierce, P.L.C.

(57) ABSTRACT

A power supply system and method includes a power grid input unit and a diesel generator input unit, separately used for supplying an alternating current to a power supply unit. An automatic transfer switch unit is connected to the power grid input unit and the power supply unit or connected to the diesel generator input unit and the power supply unit, which is used for converting the received alternating current into a direct current. A control unit, which is used for monitoring a current load current and current diesel generator power, determines when to turn off a preset number of power supply loads according to a magnitude relationship between the current diesel generator power and the current load power, as well as according to priority levels of current loads.

39 Claims, 15 Drawing Sheets

(51) Int. Cl.
*H02J 9/06* (2006.01)
*F01M 1/00* (2006.01)
*F02B 63/04* (2006.01)

(52) U.S. Cl.
CPC .............. *H02J 9/061* (2013.01); *H02J 9/066* (2013.01); *H02J 2009/068* (2013.01)

(58) Field of Classification Search
USPC .......................................................... 307/23
See application file for complete search history.

(56) References Cited

U.S. PATENT DOCUMENTS

| | | | |
|---|---|---|---|
| 6,483,204 | B2 | 11/2002 | Hanaki |
| 9,331,523 | B2 | 5/2016 | Yamada et al. |
| 2006/0076831 | A1* | 4/2006 | Meyers ..................... H02J 9/06 307/10.1 |
| 2013/0187462 | A1 | 7/2013 | Lim et al. |
| 2014/0062202 | A1 | 3/2014 | Yamada et al. |
| 2015/0194707 | A1* | 7/2015 | Park .................. H01M 10/4207 429/50 |

FOREIGN PATENT DOCUMENTS

| | | |
|---|---|---|
| CN | 102318165 A | 1/2012 |
| CN | 102377192 A | 3/2012 |
| CN | 102480164 A | 5/2012 |
| CN | 102624053 A | 8/2012 |
| CN | 102931683 A | 2/2013 |
| CN | 102931687 A | 2/2013 |
| CN | 103618378 A | 3/2014 |
| CN | 103762707 A | 4/2014 |
| CN | 103855791 A | 6/2014 |
| TW | 201220644 A | 5/2012 |
| WO | WO-2009/012451 A2 | 1/2009 |
| WO | WO-2011039600 A1 | 4/2011 |
| WO | WO-2012124130 A1 | 9/2012 |
| WO | WO-2012162570 A1 | 11/2012 |

OTHER PUBLICATIONS

First Chinese Office Action regarding Application No. 201410506085.0 dated Jul. 4, 2017. English translation provided.
First Chinese Office Action regarding Application No. 201410506108.8 dated Jun. 28, 2017. English translation provided.
Rao, Cheng-cheng et al., "Enhancement of the stable operation ability of large-scale wind power system based on the VSC-HVDC embedded in energy storage apparatus," Power System Protection and Control, vol. 42, No. 4; Feb. 16, 2017, pp. 1-7.
Second Chinese Office Action regarding Application No. 201410506108.8 dated Nov. 27, 2017. English translation provided.
Second Chinese Office Action regarding Application No. 201410506085.0 dated Dec. 14, 2017. English translation provided.
International Search Report (English and Chinese) for PCT/CN2015/088525, ISA/CN, Haidian District, Beijing, dated Nov. 25, 2015.
Written Opinion of the ISA (Chinese) for PCT/CN2015/088525, ISA/CN, Haidian District, Beijing, dated Nov. 25, 2015.
First Chinese Office Action regarding Application No. 201410441242.4 dated Jun. 2, 2017. English translation provided by Unitalen Attorneys at Law.
Wei et al, "Distributed Generation and Effects of Its Parallel Operation on Power System," High Voltage Engineering, China Academic Journal Electronic Publishing House, Jan. 2007, vol. 33 No. 1, pp. 36-40.
Partial Supplementary Search Report regarding European Patent Application No. 15838675.5, dated Apr. 26, 2018.
Extended European Search Report regarding European Application No. 18208993.8 and dated Apr. 16, 2019.
Extended European Search Report regarding European Application No. 18208295.8 and dated Apr. 15, 2019.
First European Office Action regarding Application No. 15838675.5 dated Jun. 4, 2019.
Tseng, K.C. et al, "High Frequency Positive/Negative Pulse Charger with Power Factor Correction," Power Electronics Specialists Conference; vol. 2; Jun. 23, 2002; pp. 671-675.

* cited by examiner

POWER SUPPLY SYSTEM AND METHOD

CROSS REFERENCE OF RELATED APPLICATION

The present application is a National Stage application of PCT international patent application PCT/CN2015/088525, filed on Aug. 31, 2015, which claims the priority to Chinese Patent Application No. 201410441242.4, titled "POWER SYSTEM AND METHOD", filed with the Chinese State Intellectual Property Office on Sep. 1, 2014, Chinese Patent Application No. 201410506106.9, titled "AC/DC DEVICE, POWER DISTRIBUTION SYSTEM AND CONTROL METHOD THEREOF", filed with the Chinese State Intellectual Property Office on Sep. 28, 2014, Chinese Patent Application No. 201410506108.8, titled "POWER DISTRIBUTION SYSTEM", filed with the Chinese State Intellectual Property Office on Sep. 28, 2014 and Chinese Patent Application No. 201410506085.0, titled "FLEXIBLE POWER DISTRIBUTION SYSTEM", filed with the Chinese State Intellectual Property Office on Sep. 28, 2014, and the entire disclosure of which is incorporated herein by reference.

FIELD

The present disclosure relates to the technical field of power supply, and in particular to a power supply system and a power supply method.

BACKGROUND

With approaching of the age of big data, an electric quantity demand of a data center (for example various types of large servers) is increasingly great, and it needs to provide sufficient electrical energy for the data center. In order to deal with a case of sudden blackout of a power grid, sufficient backup electrical energy is needed, such that the data center can operate normally using the backup electrical energy even if the power grid can not supply power normally. In a power supply system of the data center, a battery and an oil engine are used to store electrical energy. In a case of designing the investment of the power supply system of the data center, the investment of a power supply system is generally considered with a priority, and no enough concern is given to model selection and configurations of the battery and the oil engine. The investment of the battery and the oil engine is great, and a cost of the power supply system will be increased if secondary investment is made due to insufficient electrical energy of the power supply system.

When the power supply system of the data center supplies power normally through the power grid, the power grid provides an alternating current to a power supply unit through an automatic transfer switch, and the power supply unit converts the alternating current into a direct current, so as to charge a later level of battery and supply power to a load to be supplied power. When the power grid blackouts, the automatic transfer switch switches to disconnect an input of the power grid from the power supply unit and connect the oil engine to the power supply unit. The oil engine provides an alternating current to the power supply unit through the automatic transfer switch, and the power supply unit converts the alternating current into a direct current to supply power to a load to be supplied power.

The conventional power supply way for the data center is described above. In a case that the oil engine and the battery are used to supply power to the load to be supplied power, generally the battery cannot be used continuously when the battery discharges in a high rate current for more than dozens of times. The life of the battery is short, and therefore the power supply time of the whole system is short, thereby resulting in poor reliability of power supply.

SUMMARY

According to embodiments of the present disclosure, a power supply system and a power supply method are provided, so as to solve a problem in the conventional technology that power supply time is short and power supply reliability is poor in a case of supplying power to a load.

According to an embodiment of the present disclosure, a power supply system is provided, which includes: a power grid input unit, an oil engine input unit, an automatic transfer switch unit, a power supply unit and a control unit, wherein the power grid input unit is configured to provide an interface connecting a power grid alternating current signal and is connected to the automatic transfer control unit;

the oil engine input unit is connected to the automatic transfer control unit and is configured to output an alternating current signal using an oil engine;

the automatic transfer switch unit is connected to the control unit and the power supply unit and is configured to, in response to an instruction of the control unit, connect the power grid input unit to the power supply unit and input the alternating current signal from a power grid to the power supply unit, when an alternating current is outputted normally by the power grid alternating current interface; and disconnect the power grid input unit from the power supply unit, connect the oil engine input unit to the power supply unit and provide the alternating current signal outputted by the oil engine to the power supply unit, when the alternating current is outputted abnormally by the power grid alternating current interface;

the power supply unit is configured to convert the received alternating current signal into a direct current signal, and supply power to a current load using the direct current signal; and the control unit is configured to monitor a state of the power grid alternating current output interface; when it is monitored that an alternating current is outputted by the power grid alternating current interface, transmit a first instruction to the automatic transfer switch unit, where the first instruction is sued to instruct the automatic transfer switch unit to connect the power grid input unit to the power supply unit; when it is monitored that no alternating current is outputted by the power grid alternating current interface, transmit a second instruction to the automatic transfer switch unit, where the second instruction is used for instructing the automatic transfer switch unit to disconnect the power grid input unit from the power supply unit and connect the oil engine input unit to the power supply unit; monitor currents and voltages of the current loads and a power of a current oil engine; and determine to turn off the predetermined number of current loads based on a magnitude relationship between the power of the current oil engine and power of the current loads, and priority levels of the current loads.

With the system according to the embodiment of the present disclosure, the control unit controls the number of the current loads according to the relationship between the power of the current oil engine and the power of the current loads and the priorities of the loads, such that power supply time is extended and a case is avoided that a power supply is powered off due to insufficient power supply time, thereby improving power supply reliability.

Further, the system further includes a battery pack unit, wherein the power supply unit is further configured to provide the direct current signal to the battery pack unit;

the control unit is further configured to instruct the power supply unit to control the battery pack to supply power to the current loads; and the battery pack unit is configured to supply power to the current loads under control of the power supply unit.

In this way, power can be prepared for the loads via the battery pack, thereby further extending the power supply time.

Further, the power supply unit may include a rectification module and a DC/DC module, wherein the rectification module is configured to convert, the received alternating current signal into a direct current signal and output the direct current signal to the DC/DC module; and the DC/DC module is configured to perform high frequency isolation on the direct current signal inputted by the rectification module, and adjust an output voltage value so as to output to the battery pack unit and the current loads.

Further, the control unit may be further configured to detect a current of the battery pack, and instruct the DC/DC module to perform high frequency negative pulse discharging on the battery pack when the detected current of the battery pack is not greater than a preset current value.

In this way, the high frequency negative pulse discharging is performed on the battery pack, vulcanization of the battery can be weakened, a life of the battery pack can be extended, and therefore power preparation for long time can be achieved using a small delay battery.

Further, the DC/DC module may be configured to control a switch circuit connected in parallel with the battery pack to perform high frequency negative pulse discharging on the battery pack after the reception of the instruction transmitted by the control unit for performing high frequency negative pulse discharging on the battery pack.

Further, the control unit may be configure to, in a case that the power of the current oil engine is greater than the power of the current loads, prohibit turning off the current loads and instruct the power supply unit to supply power to the battery pack unit and the current loads; in a case that the power of the oil engine is not greater than the power of the current loads, turn off a first number of current loads starting from the load with a low priority according to an ascending order of priorities of the current loads; and in a case that the loads with priority levels less than a preset level each are turned off and the power of the current oil engine is not greater than the power of the current loads, instruct the DC/DC module to control the battery pack to supply power to the current loads.

In this way, by presetting priority levels of respective loads, the control unit manages the loads intelligently, thereby extending power supply time for a load with a high priority more efficiently using the power of the oil engine.

Further, the automatic transfer switch unit may be a plurality of single-pole double-throw switches.

According to an embodiment of the present disclosure, a power supply method is provided, which includes:

converting an alternating current provided by an oil engine into a direct current when the oil engine starts to supply power;

monitoring a current of current loads and a power of a current oil engine;

supplying power to a battery pack and the current loads using the direct current in a case that the power of the current oil engine is greater than power of the current loads;

turning off a first number of loads to be supplied power starting from the load to be supplied power with a low priority according to an ascending order of priorities of the current loads, in a case that the power of the current oil engine is not greater than the power of the current loads; and controlling the battery pack to supply power to the current loads after the loads to be supplied power having a priority lower than a preset level each are turned off and the power of the current oil engine is not greater than the power of the current loads With the method according to the embodiment of the present disclosure, the number of the current loads is controlled according to relationship between the power of the current oil engine and the power of the current loads, and priority levels of the loads, such that power supply time can be extended and a case can be avoided that a power supply is powered off due to insufficient power supply time, thereby improving power supply reliability.

Further, before the oil engine starts to supply power, the method may further include:

monitoring an operation state of a power grid input unit; and determining whether the power grid input unit stops supplying power.

Further, the method may further include;

detecting a current of the battery pack; and controlling the battery pack to perform negative pulse discharging in a case that the detected current of the battery pack is not greater than a preset current value.

In this way, the high frequency negative pulse discharging is performed on the battery pack, vulcanization of the battery can be weakened, a life of the battery pack can be extended, and therefore power preparation for long time can be achieved using a small delay battery.

Other features and advantages of the present disclosure will be clarified in the description later, and a part of the other features and advantages become obvious from the description or are known by implementing the present disclosure. The objects and other advantages of the present disclosure can be achieved and obtained by structures particularly described in the description, claims and drawings.

BRIEF DESCRIPTION OF THE DRAWINGS

The drawings are used to provide further understanding of the present disclosure and form a part of the description. The drawings together with embodiments in the present disclosure are used to explain the present disclosure and are not intended to limit the present disclosure. In the drawings.

DETAILED DESCRIPTION OF THE EMBODIMENTS

In order to provide a technical solution of extending power supply time and improving power supply reliability, a power supply system and a power supply method are provided according to embodiments of the present disclosure. Hereinafter preferred embodiments of the present disclosure are illustrated in conjunction with the drawings of the description. It should be understood that, the preferred embodiments described here are only used to illustrate and explain the present disclosure rather than limit the present disclosure. The embodiments in the present disclosure and features in the embodiments may be combined with each other without a conflict.

Figure 1:
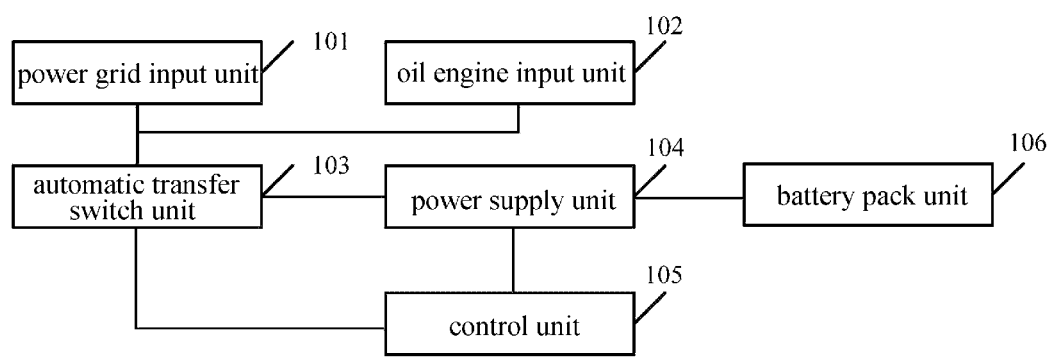
FIG. 1 shows a schematic structural diagram of a power supply system according to an embodiment of the present disclosure.

A power supply system is provided according to an embodiment of the present disclosure. As shown in FIG. 1, the power supply system includes: a power grid input unit 101, an oil engine input unit 102, an automatic transfer switch unit 103, a power supply unit 104 and a control unit 105, wherein the power grid input unit 101 is configured to provide an interface connecting a power grid alternating current signal and is connected to the automatic transfer control unit;

the oil engine input unit 102 is connected to the automatic transfer control unit and is configured to output an alternating current signal an the oil engine;

the automatic transfer switch unit 103 is connected to the control unit and the power supply unit and is configure to, in response to an instruction of the control unit, connect the power grid input unit to the power supply unit and input the alternating current signal from a power grid to the power supply unit, when an alternating current is outputted normally by the power grid alternating current interface; and disconnect the power grid input from the power supply unit, connect the oil engine input unit to the power supply unit and provide the alternating current signal outputted by the oil engine to the power supply unit, when the alternating current is outputted abnormally by the power grid alternating current interface;

the power supply unit 104 is configured to convert the received alternating current signal into a direct current signal and supply power to current loads using the direct current signal; and the control unit 105 is configured to monitor a state of the power grid alternating current output interface; when it is monitored that an alternating current is outputted by the power grid alternating current interface, transmit a first instruction to the automatic transfer switch unit, where the first instruction is used for instructing the automatic transfer switch unit to connect the power grid input unit to the power supply unit; when it is monitored that no alternating current is outputted by the power grid alternating current interface, transmit a second instruction to the automatic transfer switch unit, where the second instruction is used for instructing the automatic transfer switch unit to disconnect the power grid input unit from the power supply unit and connect the oil engine input unit to the power supply unit; monitor currents and voltages of the current loads and a power of a current oil engine; and determine to turn off the predetermined number of current loads based on a magnitude relationship between the power of the current oil engine and power of the current loads, and priority levels of the current loads.

With the system according to the embodiment of the present disclosure, the control unit can monitor a state of the power grid alternating current output interface and control the automatic transfer switch unit to be connected to the power grid input unit or the oil engine input unit according to whether the power grid alternating current interface outputs the alternating current signal normally. In a normal case, the power grid alternating current interface outputs the alternating current signal to supply power to the loads. In a case that the power grid blackouts, power is supplied to the loads by the oil engine input unit.

Further, the system further includes a battery pack unit 106, wherein
the power supply unit 104 is further configured to provide the direct current signal to the battery pack unit;
the control unit 105 is further configured to instruct the power supply unit to control the battery pack to supply power to the current loads; and
the battery pack unit 106 is configured to supply power to the current loads under control of the power supply unit.

Figure 2:
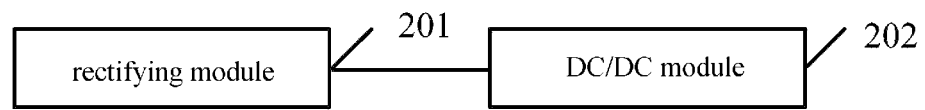
FIG. 2 shows a schematic structural diagram of a power supply unit of a power supply system according to an embodiment of the present disclosure.

Further, as shown in FIG. 2, the power supply unit 104 includes a rectification module 201 and a DC/DC module 202, wherein
the rectification module 201 is configured to convert the received alternating current signal into a direct current signal and output the direct current signal to the DC/DC module; and
the DC/DC module 202 is configured to perform high frequency isolation on the direct current signal inputted by the rectification module, and adjust an output voltage value so as to output to the battery pack unit and the current loads.

Further, the control unit 105 is further configured to detect a current of the battery pack, and instruct the DC/DC module to perform high frequency negative pulse discharging on the battery pack when the detected current of the battery pack is not greater than a preset current value.

Further, the DC/DC module 202 is configured to control a switch circuit connected in series with the battery pack to perform high frequency negative pulse discharging on the battery pack, after the reception of the instruction transmitted by the control unit for performing negative pulse discharging on the battery pack.

Furthermore, the control unit 105 is configured to prohibit turning off the current loads and instruct the power supply unit to supply power to the battery pack unit and the current loads, in a case that a power of the current oil engine is greater than power of the current loads; turn off a first number of current loads starting from the load with a low priority according to an ascending order of priorities of the current loads, in a case that the power of the current oil engine is not greater than the power of the current loads; and instruct the DC/DC module to control the battery pack to supply power to the current loads in a case that all loads with a priority level less than a preset level each are turned off and the power of the current oil engine is not greater than the power of the current loads.

Further, the automatic transfer switch unit is multiple single-pole double-throw switches.

Hereinafter the system and method according to the present disclosure are described in detail using specific embodiments.

First Embodiment

Figure 3:
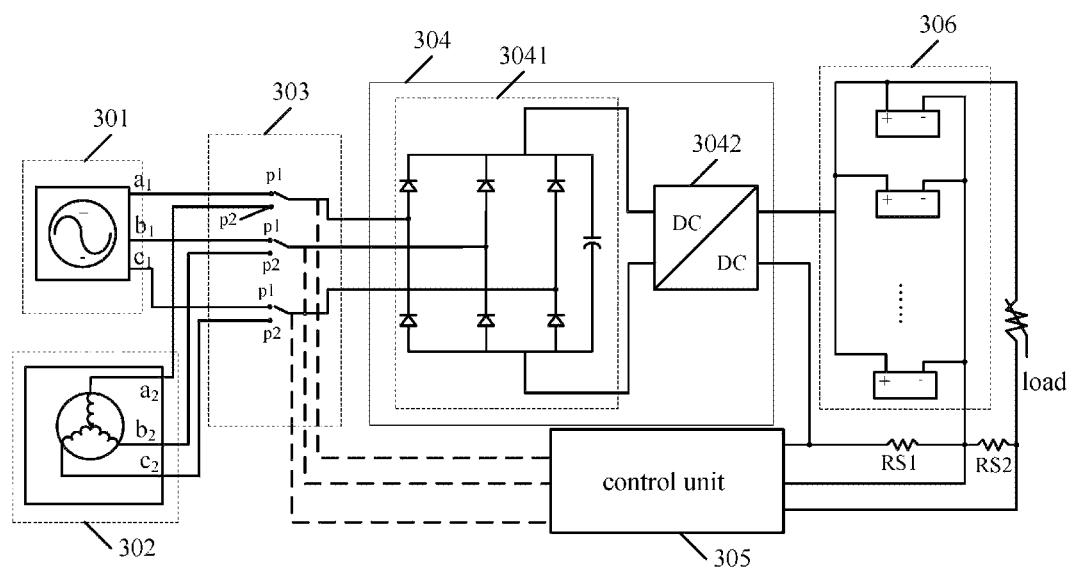
FIG. 3 shows a first schematic structural diagram of a power supply system according to a first embodiment of the present disclosure.

A power supply system is provided according to a first embodiment of the present disclosure, and a schematic structural diagram of which is shown in FIG. 3. The power supply system includes: a power grid input unit 301, an oil engine input unit 302, an automatic transfer switch unit 303, a power supply unit 304, a control unit 305 and a battery pack unit 306. The power supply system may supply power in two operation modes: a power grid power supply mode and an oil engine power supply mode. Specific operation principles are as follows.

The power grid input unit 301 provides an interface to connect a power grid alternating current signal, and the power grid alternating current signal may be inputted through the interface. The interface may provide a three-phase alternating current, and the interface includes three phase input interfaces a1, b1 and c1, and a1, b1 and c1 are connected to first contacts p1 of three single-pole double-throw switches of the automatic transfer switch unit 303, respectively.

The oil engine input unit 302 supplies power using an oil engine, and three phase output points a2, b2 and c2 of a three phase power supply of the oil engine input unit 302 are connected to second contacts p2 of the three single-pole double-throw switches of the automatic transfer switch unit 303, respectively.

The power grid input unit 301 and the oil engine input unit 302 provide a three phase alternating current signal to the power supply unit 304 through the automatic transfer switch unit 303. The power supply unit 304 includes a rectification module 3041 and a DC/DC module 3042. The power grid input unit 301 or the oil engine input unit 302 provides a three phase alternating current signal to the rectification module 3041 through the automatic transfer switch unit 303, the rectification module 3041 converts the three phase alternating current signal into a direct current bus voltage so as to output to the DC/DC module 3042, and the DC/DC module 3042 converts the direct current bus voltage into a direct current voltage with high accuracy through high frequency isolation.

The control unit 305 monitors a state of an alternating current signal output from the power grid alternating current interface of the power grid input unit 301, and specifically, may determine whether the alternating current signal output from the power grid alternating current interface is normal by detecting a voltage of the first contacts p1. When it is detected that the voltage of the p1 is normal, it is determined that the alternating current signal output from the power grid alternating current interface is normal; the control unit 305 transmits a first instruction to the automatic transfer switch unit 303 to instruct a single pole of the automatic transfer switch unit 303 to be connected to the first contact p1, so as to connect the power grid input unit 301 to the power supply unit 304. In this case, a grid power supplies power to later levels of devices.

The control unit 305 may determine a current flowing through the battery pack by current detecting devices RS1 and RS2. Specifically, the control unit 305 may detect voltages across RS1 and RS2, and may determine a value of a current flowing through RS1 and RS2 according to resistances of RS1 and RS2. The current flowing through RS1 is a total current flowing through the battery pack and the loads, and the current flowing through RS2 is a current flowing through the loads, and (RS1-RS2) is a current flowing through the battery pack. The battery pack is used to store electrical energy and supply power to the loads. If the battery pack discharges in a high rate current for multiple times when supplying power to the loads, resulting in that the battery is vulcanized and the life of the battery is shortened, therefore negative pulse discharging recovering is to be performed on the battery pack. When the control unit 305 detects that the current of the battery pack is not greater than a preset current value, the control unit 305 transmits an instruction to the DC/DC module 3042 to perform high frequency negative pulse discharging on the battery pack. After the reception of the instruction, the DC/DC module 3042 controls a switch circuit connected in series with the battery pack to perform high frequency negative pulse discharging on the battery pack. The preset current value may be a preset percentage of a rated current of the battery pack, for example, the preset current value may be 30% of the rated current of the battery pack. Performing negative pulse discharging recovering on the battery pack can weaken vulcanization of the battery and extend the life of the battery pack. Charging and discharging of the battery pack by the control unit, the life of the battery pack is extended, thereby achieving power preparation for long time using small delay batteries.

When the control unit 305 monitors that the voltage of the first contact p1 is zero, it is determined that the alternating current signal outputted by the power grid alternating current interface is abnormal, and the power grid blackouts; the control unit 305 transmits a second instruction to the automatic transfer switch unit 303 to instruct a single pole of the automatic transfer switch unit 303 to be connected to the second contact p2, so as to connect the oil engine input unit 302 to the power supply unit 304. In this case, the oil engine input unit 301 supplies power for the later levels of devices.

The alternating current signal provided by the power grid input unit 301 or the oil engine input unit 302 is converted into a direct current signal after passing through the rectification module 3041. The rectification module 341 outputs the direct current signal to the DC/DC module 3042, and the DC/DC module 3042 performs high frequency isolation on the direct current signal inputted by the rectification module and adjusts an output voltage value, thereby charging battery packs in the battery pack unit 306 and supplying power to the loads.

In a case of supplying power using the oil engine, the power preparation time depends on a quality of diesel or gasoline to a great extent. Power is supplied to a load with a high priority according to an output power of the oil engine, thereby providing maximum power preparation time for the loads using a small capacity oil engine. Specifically, based on a voltage across RS2, i.e., a voltage of the current load, and the calculated current of RS2, the control unit 305 may obtain a power of the current load is a product of the voltage across RS2 and the current value. The control unit 305 may determine a power of the current oil engine as a product of the detected output voltage of the oil engine and the detected total output current of the oil engine, i.e., the current of RS1. The control unit may determine an output voltage of the oil engine by detecting a voltage of the second contact p2.

Priorities are set for respective loads in advance according to importance of the respective loads. Corresponding switches are provided for each path of loads, and the switches are operated to switch the loads so as to control the loads. When the power of the current oil engine is greater than the power of the current loads, the power of the current oil engine can meet power supply requirements of respective loads, all load switches are closed and in a normal operation state, and the control unit 305 controls to prohibit turning off the current loads and instruct the power supply unit 304 to supply power to the battery pack unit and all the current loads. When the power of the current oil engine is not greater than the power of the current loads, a first number of current loads are turned off starting from a load to be supplied power with a low priority according to an ascending order of priorities of the current loads. The first number may be set flexibly according to actual experiences and need. For example, a load with the lowest priority is closed, and then the magnitude relationship between the power of the current oil engine and the power of the current loads is determined after the load is closed; and if the power of the current oil engine is still not greater than the power of the current loads, a load with the lowest priority in the remaining loads is turned off continuously. In a case that all current loads with a priority level less than a preset level are turned off and the power of the current oil engine is not greater than the power of the current loads, the control unit 305 instructs the DC/DC module to control the battery pack to supply power to the current loads. In this case, both the oil engine and the battery pack supply power to the current loads. Since the power of the oil engine is not enough to supply power to the current loads, the batteries discharge continuously until the batteries are in an under voltage protection state. During the process of supplying power by the oil engine, priority levels are set for respective loads in advance according to importance of the respective loads, such that the loads are managed intelligently, thereby extending power supply time for the loads with a high priority more efficiently using the power of the oil engine.

Figure 4:
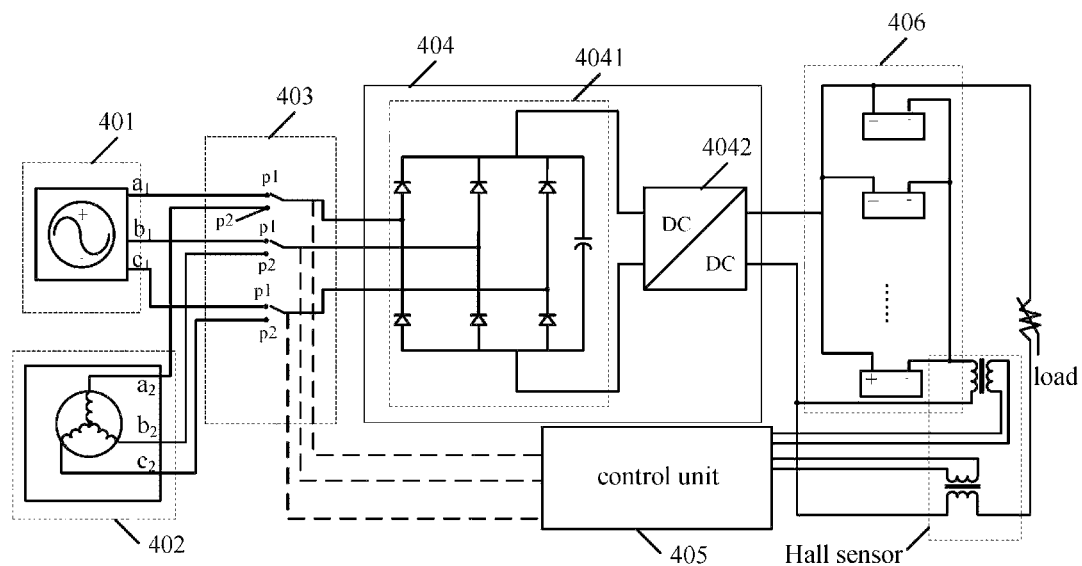
FIG. 4 shows a second schematic structural diagram of the power supply system according to the first embodiment of the present disclosure.

Further, the current detection devices RS1 and RS2 may be replaced with Hall sensors. As shown in FIG. 4, the power supply system includes a power grid input unit 401, an oil engine input unit 402, an automatic transfer switch unit 403, a power supply unit 404, a control unit 405, a battery pack unit 406, a rectification module 4041 and a DC/DC module 4042.

Figure 5:
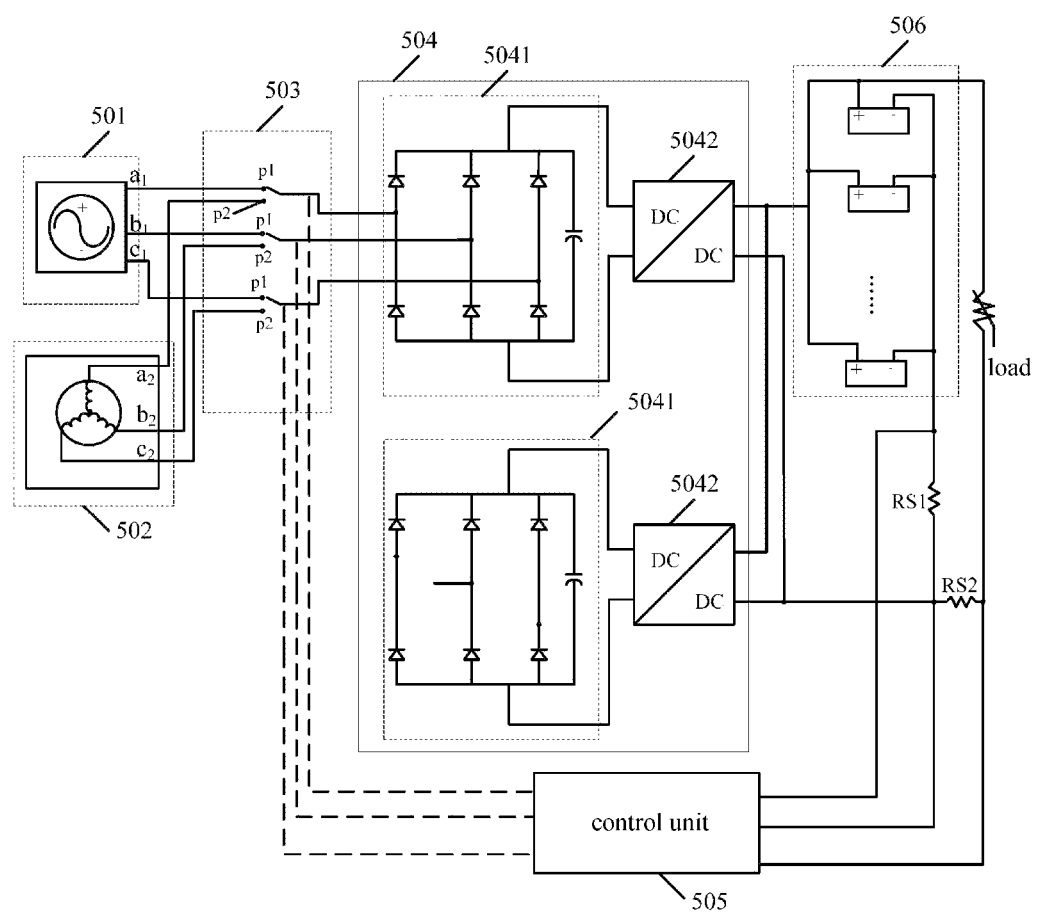
FIG. 5 shows a third schematic structural diagram of the power supply system according to the first embodiment of the present disclosure.

Further, the power supply system may be implemented by multiple rectification modules connected in parallel with multiple DC/DC modules. As shown in FIG. 5, the power supply system includes a power grid input unit 501, an oil engine input unit 502, an automatic transfer switch unit 503, a power supply unit 504, a control unit 505, a battery pack unit 506, rectification modules 5041 and DC/DC modules 5042.

Further, the power input unit 301 and the oil engine input unit 302 may provide a single phase alternating current signal. For the single phase alternating current signal, the automatic transfer switch unit 303 may be connected to the alternating current signal interface through two single-pole double-throw switches, and the rectification module may be implemented as a rectification circuit in the conventional technology for converting a single phase alternating current signal into a direct current signal, which is not described in detail here.

With the system according to the first embodiment of the present disclosure, the control unit controls the number of current loads according to relationship between the power of the current oil engine and the power of the current loads, and priority levels of the loads, power supply time can be extended and a case that the power supply is powered off due to insufficient power supply time can be avoided, thereby improving power supply reliability. In addition, negative pulse discharging recovering is performed on the battery pack, vulcanization of the batteries can be reduced, thereby extending the life of the batteries.

Second Embodiment

Figure 6:
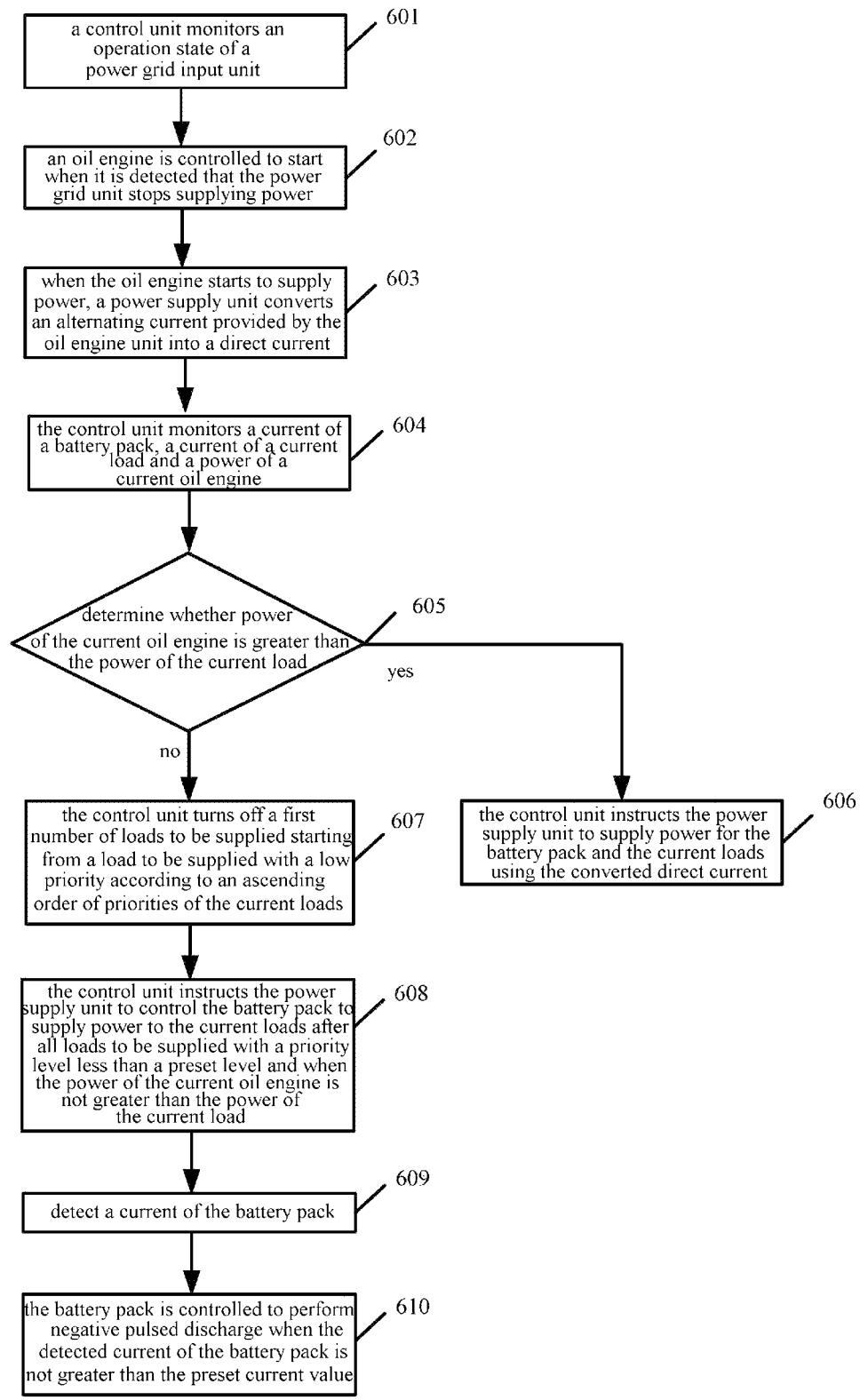
FIG. 6 shows a flowchart of a power supply method according to a second embodiment of the present disclosure.

Based on the same concept as the power supply system according to the above embodiment of the present disclosure, a power supply method is further provided according to a second embodiment of the present disclosure accordingly. As shown in FIG. 6, in combination with respective units included in the power supply system, the method includes step 601 to step 610 in the following.

In step 601, a control unit monitors an operation state of a power grid input unit.

In this step, in a normal case, electrical energy is provided for a later level of devices by the power grid input unit. In order to avoid loss due to stopping operation of the loads when a power grid suddenly blackouts, it needs to monitor an operation state of the power grid, such that electrical energy can be provided using an oil engine or a battery pack when the power grid blackouts.

In step 602, an oil engine is controlled to start when it is detected that the power grid input unit stops supplying power.

Specifically, a control unit may control an automatic transfer switch unit to be connected to the power grid input unit or an oil engine input unit.

In step 603, a power supply unit converts an alternating current provided by the oil engine into a direct current when the oil engine starts to supply power.

In this step, the alternating current may be converted into the direct current using an existing rectification circuit.

In step 604, the control unit monitors a current of a battery pack, a current of current loads and a power of a current oil engine.

In step 605, the control unit determines whether the power of the current oil engine is greater than power of the current loads; the method proceeds to step 606 if the power of the current oil engine is greater than the power of the current loads; otherwise, the method proceeds to step 607.

In this step, the power of the current loads may be determined by a product of the current of the current loads and the resistance of the current loads.

In step 606, the control unit instructs the power supply unit to supply power to the battery pack and the current loads using the converted direct current, when the power of the current oil engine is greater than the power of the current loads.

In step 607, the control unit turns off the first number of loads to be supplied power starting from a load to be supplied power with a low priority according to an ascending order of priorities of the current loads, when the power of the current oil engine is greater than the power of the current loads; and the method returns to step 605.

The first number may be set flexibly according to actual experiences and need. Specifically, the control unit may turn off a load with the lowest priority and the method returns to step 605, i.e., continuing to determine the magnitude relationship between the power of the current oil engine and the power of the current loads.

In step 608, the control unit instructs the power supply unit to control the battery pack to supply power to the current loads, in a case that all loads to be supplied power with a priority level less than a preset level each are turned off and the power of the current oil engine is not greater than the power of the current loads.

Further, the battery pack discharges in a high rate current for multiple times when supplying power to the loads, resulting in that vulcanization of the batteries appears and the life of the batteries is shortened, therefore negative pulse discharging recovering is to be performed on the battery pack. Specific processing is shown in step 609 in the following.

In step S609, a current of the battery pack is detected.

In step 610, the battery pack is controlled to perform negative pulse discharging when it is detected that the current of the battery pack is not greater than a preset current value.

The preset current value may be a preset percentage of a rated current of the battery pack, for example, 20% of the rated current of the battery pack.

With the method according to the second embodiment of the present disclosure, the control unit controls the number of the current loads according to relationship between the power of the oil engine and the power of the current loads and priority levels of the loads, such that the power supply time can be extended and a case that the power supply is powered off due to insufficient power supply time can be avoided, thereby improving power supply reliability. In addition, negative pulse discharging recovering is performed on the battery pack, such that vulcanization of the batteries can be reduced, thereby extending the life of the batteries.

In summary, the solution according to the embodiment of the present disclosure is as follows. The power supply system includes the power grid input unit, the oil engine input unit, the automatic transfer switch unit, the power supply unit, the control unit and the battery pack unit. The power grid input unit is configured to provide an alternating current to the power supply unit; the oil engine input unit is configured to provide an alternating current to the power supply unit; the automatic transfer switch unit is configured to, in response to an instruction of the control unit, connect the power grid input unit to the power supply unit via the switch when the power grid input unit supplies power normally; and connect the oil engine input unit to the power supply unit by switching the switch when the power grid input unit stops supplying power; the power supply unit is configured to convert the received alternating current into a direct current to provide to the battery pack unit and supply power to the current loads; the control unit is configured to monitor an operation state of the power grid operation unit; control the automatic transfer switch unit to be connected to be power grid input unit when it is monitored that the power grid input unit operates normally; control the automatic transfer switch unit to be connected to the oil engine input unit when it is monitored that the power grid input unit stops supplying power; monitor a current of the battery pack, a current of the current loads and a power of the current oil engine; determine a load to be supplied power which is to be turned off based on a magnitude relationship between the power of the current oil engine and the power of the current loads; control the battery pack to supply power to the current loads in a case that all loads to be supplied power with a priority level less than a preset level are turned off and the power of the oil engine is less than the power of the current loads; and control the battery pack to perform negative pulse discharging according to the monitored current of the battery pack; and the battery pack unit is configured to supply power to the loads to be supplied power. With the solution according to the embodiments of the present disclosure, the power supply time is extended and the power supply reliability is improved.

Figure 7:
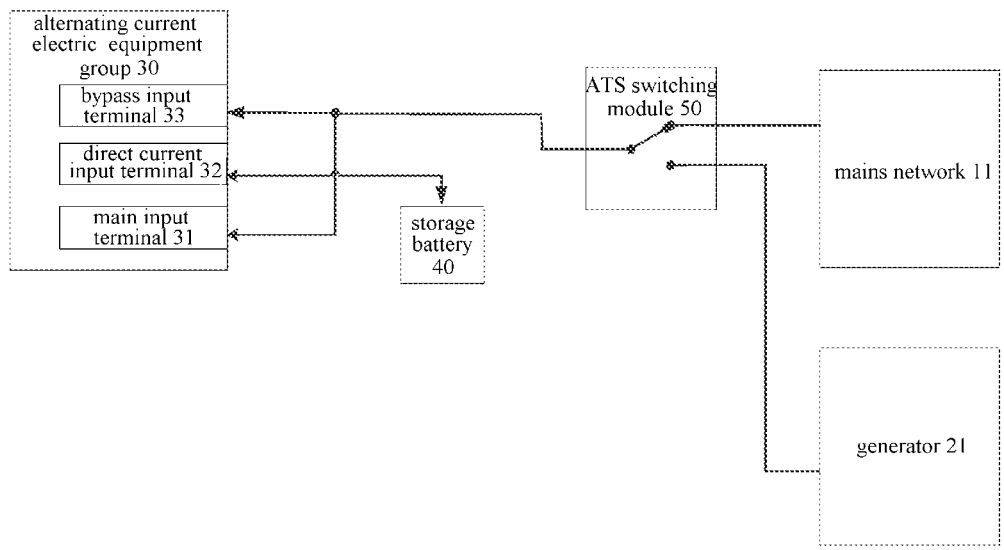
FIG. 7 shows a principle block diagram of a first embodiment of the conventional typical power distribution system.

Reference is made to FIG. 7 which shows a principle block diagram of a first embodiment of a typical power distribution system, for example a power distribution system of a data machine room. As shown in FIG. 7, the power distribution system is mainly composed of a mains network 11, a generator 21, an alternating current electric equipment group 30, a storage buttery 40 and an automatic transfer switch (ATS) switching module 50. The mains network 11 may include one path or two paths, and the generator 21 for example a diesel generator functions as a backup power supply when the mains blackouts. When the mains network 11 is normal, the ATS switching module 50 guides the mains into the alternating current electric equipment group 30. When the mains network 11 is abnormal, for example the mains blackouts or a fault occurs, the ATS switching module 50 transmits a signal to a controller of the generator 21, such that the generator 21 begins to start. Before the generator 21 is started, the alternating current electric equipment group 30 acquires power from the storage battery 40 within a short time period, so as to maintain a normal operation of the system. After the generator 21 is started, the ATS switching module 50 automatically switches to the generator 21, and transmits the power from the generator 21 to the alternating current electric equipment group 30, thereby supplying power continuously.

The alternating electric equipment group 30 may include a main input terminal 31, a direct current input terminal 32 and a bypass input terminal 33. In FIG. 7, two input terminals of the ATS switching module 50 are connected to the mains network 11 and the generator 21 respectively, and an output terminal of the ATS switching module 50 is connected to the main input terminal 31 and the bypass input terminal 33 of the alternating current electric equipment group 30, so as to serve as a main power supply and a bypass power supply. The direct input terminal 32 of the alternating current electric equipment group 30 is connected to the storage battery 40. When the mains network 11 is normal, power is supplied to the alternating current electric equipment group 30 by the mains network 11 through the main input terminal 31. When the mains network 11 is abnormal, the main input terminal 31 is powered down, the alternating current electric equipment group 30 is connected to the storage battery 40 through the direct current input terminal 32, and an inverting module in the direct current input terminal 32 can invert a direct current from the storage battery 40 into an alternating current for use. After the generator 21 is started, the main input terminal 31 detects that power is inputted, and therefore a power supply input is switched from the direct current input terminal 32 back to the main input terminal 31 for normal use. The bypass input terminal 33 functions as a backup power supply when both the main input terminal 31 and the direct current input terminal 32 are powered down or abnormal. The alternating electric equipment group 30 and the storage battery 40 may be one or more sets. As shown by the second embodiment in FIG. 8, the power distribution system includes N sets of alternating current electric equipment groups and N sets of storage batteries, for example, a first alternating current electric equipment group 30-1, a second alternating current electric equipment group 30-2, . . . , an N-th alternating current electric equipment group 30-N; a first storage battery 40-1, a second storage battery 40-2, . . . , an N-th storage battery 40-N, where N is a natural number greater than 1. Respective sets of alternating current electric equipment groups 30 are connected to a corresponding storage battery 40 in a similar way and are all connected to the ATS switching module 50.

In the conventional power distribution system, the generator 21 is directly hooked up to the alternating current electric equipment group 30. The alternating current electric equipment group 30 may include various types of alternating current electric equipments, for example an uninterrupted power supply (UPS) system, a high voltage direct current output (HVDC) system or an air conditioner. Some alternating current electric equipments have a feature of a great instantaneous input current. For example, when the UPS switches from the storage battery 40 to the generator 21 to supply power, and it is equivalent that a great load is increased suddenly for the generator 21. When the UPS is switched to the generator 21, an instantaneous input power of the UPS is generally greater than its rated input power, therefore it is required that the capacity to be configured of the generator 21 increases to about 2 times, so as to satisfy reliable and safe uninterrupted operation of the system. However, in this way after the capacity of the generator 21 increases, an output power of the generator 21 is far lower than a rated power of the generator 21 when the generator 21 operates in a steady state, thereby resulting in great waste. In addition, the alternating current electric equipments have various performances, some of which present inductive for example an air conditioner; and some of which present capacitive loads when lightly loaded, for example the uninterrupted power supply (UPS) system or a high voltage direct current (HVDC) output system. For the generator 21 for example a diesel generator, the capacitive load is weak and in order to improve the reliability of the system, generally it is required to configure the capacity of the diesel generator to be about 2 times of all the alternating current electric equipments. In addition, even if the alternating current electric equipment group 30 does not operate at full capacity, it also needs to provide the generator 21 with a great capacity, so as to satisfy the requirement on the suppress of a reactive power and input harmonics of the input capacitor.

For the drawback that the conventional power distribution system needs to configure a high capacity of the generator, resulting in resource waste when the generator operates in a steady state, another power supply system including an AC/DC converting module is further provided according to an embodiment of the present disclosure, which can reduce the configuration of the generator effectively.

Third Embodiment

Figure 9:
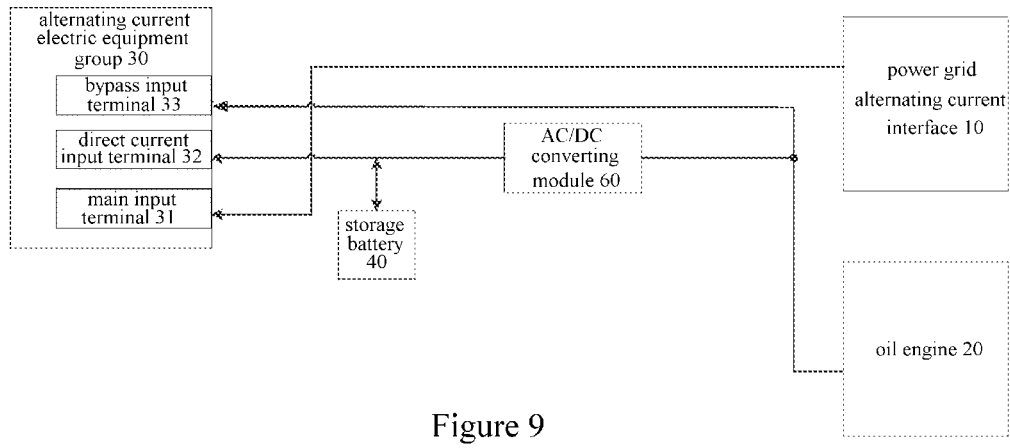
FIG. 9 shows a schematic structural diagram of a part of a power supply system according to a third embodiment of the present disclosure.

A third embodiment of the present disclosure further provides another power supply system, which may particularly function as a power distribution system of a data machine room. As shown in FIG. 9, in addition to the power grid input unit 101, the oil engine input unit 102, the automatic transfer switch unit 103, the power supply unit 104 and the control unit 105 (which are not shown in FIG. 9) shown in FIG. 1, the power supply system may further include at least an alternating current electric equipment group 30, a storage battery 40 and an AC/DC converting module 60.

Power is supplied to the alternating current electric equipment group 30 by a power grid alternating current signal when a power grid alternating current interface 10 outputs an alternating current normally. In the embodiment of the present disclosure, the power grid input unit 101 provides an interface 10 for connecting to a power grid alternating current signal, i.e. the mains network, and thus outputting the power grid alternating current signal. When the power grid alternating current interface 10 outputs an abnormal alternating current, for example the mains blackouts or a fault occurs, the oil engine 20 receives a signal indicating that the mains network is abnormal, and begins to start. Before the oil engine 20 is started, power is supplied to the alternating current electric equipment group 30 by the storage battery 40, so as to maintain a normal operation of the system. In the embodiment of the present disclosure, the oil engine input unit 102 outputs an alternating current signal using an oil engine 20. The oil engine 20 is also referred to as an oil generator, and the oil engine 20 is a diesel generator or a gasoline generator. The alternating current electric equipment group 30 may include various types of alternating current electric equipments, for example an uninterrupted power supply (UPS) system, a high voltage direct current (HVDC) output system or an air conditioner and so on.

The unique feature of the embodiment lies in that: the AC/DC converting module 60 is added in the power supply system; after the oil engine 20 is started, the AC/DC converting module 60 converts the alternating current from the oil engine 20 into the direct current for outputting, and supplies the direct current to the storage battery 40. In this case, it is equivalent that both the storage battery 40 and the AC/DC converting module 60 supply power to the alternating current electric equipment group 30.

In the embodiment of the present disclosure, a process of supplying power by both the storage battery 40 and the AC/DC converting module 60 after the oil engine 20 is started is controlled. When a total power demand of all loads operating currently in the alternating current electric equipment group 30 is greater than an instantaneous power of the oil engine 20, both the AC/DC converting module 60 and the storage battery 40 supply power to the alternating current electric equipment group 30. When the total power demand of all loads operating currently in the alternating current electric equipment group 30 is equal to or less than the instantaneous power of the oil engine 20, the AC/DC converting module 60 supplies power to the alternating current electric equipment group 30, and at the same time the AC/DC converting module 60 charges the storage battery 40. The control process may be implemented by a control module. The control module may, after the oil engine 20 is started, determine whether the total power demand of the alternating current electric equipment group 30 is greater than the instantaneous power of the oil engine 20 for example by detecting the total input current of the alternating current electric equipment group 30; and control the storage battery 40 to enter a discharging mode in a case that it is determined that the total power demand is greater than the instantaneous power, where in this case both the AC/DC converting module 60 and the storage battery 40 supply power; and control the storage battery 40 to enter a charging mode in a case that it is determined that the total power demand is not greater than the instantaneous power, the AC/DC converting module 60 supplies power to the alternating current electric equipment group 30 while charges the storage battery 40. The control module further controls the storage battery 40 to supply power to the alternating current electric equipment group 30 before the power grid alternating current interface 10 outputs an abnormal alternating current and the oil engine 20 is started.

In the embodiment, the AC/DC converting module 60 is added to convert the alternating output power of the oil engine 20 into the direct current output power, and supplies power to the alternating current electric equipment group 30 in combination with the storage battery 40. The architecture adapts to a scene in which the instantaneous output energy requirement is greater than the input energy requirement, and a too high configuration can be avoided in this scene. When the total power demand of the alternating current electric equipment group 30 is greater than the instantaneous power of the oil engine 20, i.e., when the instantaneous energy required by alternating current electric equipment group 30 is greater than the input energy, both the AC/DC converting module 60 and the storage battery 40 supply power, such that the oil engine 20 can adapt to a load with a pulsed power requirement, thereby reducing the capacity configuration of the oil engine 20. When the total power requirement of the alternating current electric equipment group 30 is equal to or less than the instantaneous power of the oil engine 20, i.e., when the energy required by loads in the alternating current electric equipment group 30 is less than the input energy, the AC/DC converting module 60 charges the storage battery 40 and supplies power to the loads. With the method, the load with the pulsed power requirement is achieved using a small oil engine 20, thereby saving the investment.

In the embodiment of the present disclosure, specific connection ways between the alternating current electric equipment group 30 and other functional modules in the power supply system are not limited, and those skilled in the art can design various connection ways as needed, as long as the power supply logic relationship described above can be satisfied. In a preferred embodiment of the present disclosure, the alternating current electric equipment group 30 may include a main input terminal 31, a direct current input terminal 32 and a bypass input terminal 33. The main input terminal 31 functions as a main power supply to supply power with a priority, the direct current input terminal 32 is used to be connected to a direct current input when the main input terminal 31 has no power supply input, and an inverting module within the direct current input terminal 32 may invert the direct current input to the direct current input terminal 32 into an alternating current for use. The bypass input terminal 33 functions as a bypass power supply i.e., a backup power supply in a case that both the main input terminal 31 and the direct current input terminal 32 are powered down or abnormal.

Since the mains network is a main power supply, the power grid alternating current signal is connected to the main input terminal 31 of the alternating current electric equipment group 30 as a main power supply in the embodiment of the present disclosure. The direct current input terminal 32 of the alternating current electric equipment group 30 is connected to the AC/DC converting module 60 and the storage battery 40, such that power is acquired through the direct current input terminal 32 when the power gird alternating current interface 10 outputs an abnormal alternating current. The bypass input terminal 33 of the alternating current electric equipment group 30 provides two types of specific connection ways for reference.

In the power supply system according to the third embodiment shown in FIG. 9, the bypass input terminal 33 of the alternating current electric equipment group 30 is connected to the oil engine 20, such that the system may switch to the bypass input terminal 33 and the oil engine 20 functions as a bypass power supply to supply power to the alternating current electric equipment group 30, when the inverting module in the alternating current electric equipment group 30 for inverting the direct current input is damaged. In the embodiment, the oil engine 20 is connected to the bypass input terminal 33, thereby functioning as the last power supply barrier to ensure the normal operation of the system.

Fourth Embodiment

Figure 10:
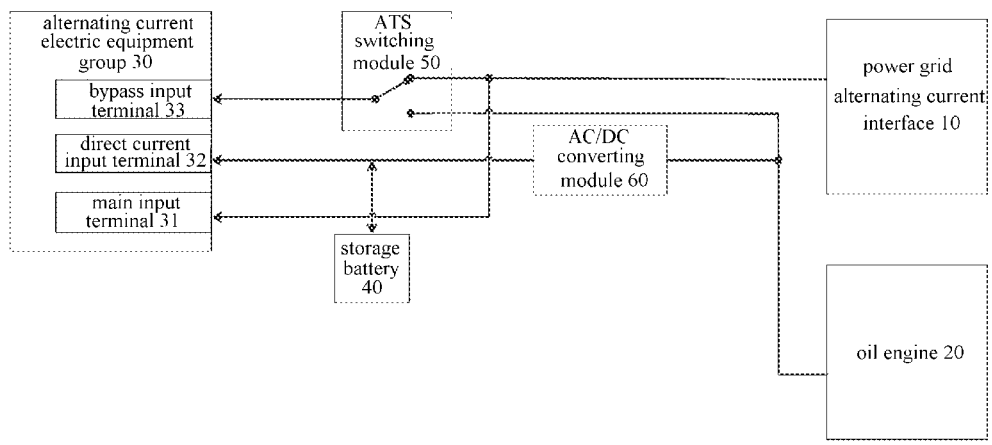
FIG. 10 shows a schematic structural diagram of a part of a power supply system according to a fourth embodiment of the present disclosure.

In a power supply system according to a fourth embodiment shown in FIG. 10, the power supply system may include an ATS switching module 50. Two input terminals of the ATS switching module 50 are connected to the power grid alternating current signal and the oil engine 20 respectively, and an output terminal of the ATS switching module 50 is connected to the bypass input terminal 33 of the alternating current electric equipment group 30 so as to function as a bypass power supply. In this way, when the inverting module within the alternating current electric equipment group 30 is damaged, the system switches to the bypass input terminal 33 and the oil engine 20 functions as the bypass power supply to supply power to the alternating current electric equipment group 30; in addition, when the power grid alternating current interface recovers to output a normal alternating current, the ATS switching module 50 switches back to the power grid alternating current signal to supply power to the alternating current electric equipment group 30.

In the conventional technology, the output of the oil engine 20 is connected to the main input terminal 31 of the alternating current electric equipment group 30, and the output of the oil engine 20 is only to be connected to the bypass input terminal 33 in the embodiment. Generally, when a voltage of the main input terminal 31 of the UPS system for example is normal in the alternating current electric equipment group 30, the main power supply is used with a priority to supply power; when the oil engine 20 operates and if the output of the oil engine 20 is directly connected to the main circuit of the UPS system to supply power, the UPS acquires power from the main circuit with a priority and does not acquire energy from the storage battery 40, thereby not satisfying the pulsed power demand by the AC/DC converting module 60. In the embodiment, the oil engine 20 is connected to the bypass input terminal 33 to function as the bypass power supply; this is because if the inverter of the UPS system is in a fault, a backup power supply is needed and the bypass power supply is the last barrier of the UPS system.

Fifth Embodiment

Figure 11:
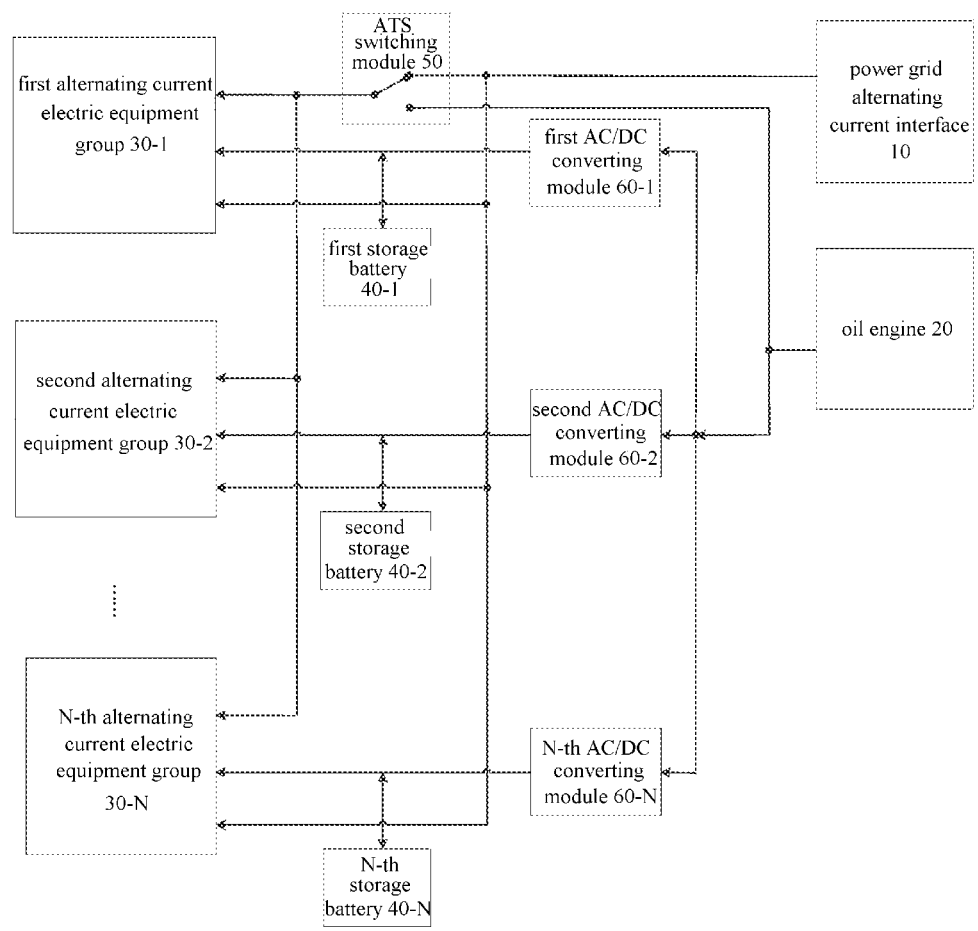
FIG. 11 shows a schematic structural diagram of a part of a power supply system according to a fifth embodiment of the present disclosure.

The alternating current electric equipment group 30, the storage battery 40 and the AC/DC converting module 60 in the power supply system according to the embodiment of the present disclosure may include one or more sets. Reference is made to FIG. 11, another embodiment of the power supply system is further provided according to a fifth embodiment of the present disclosure. In addition to the power grid input unit 101, the oil engine input unit 102, the automatic transfer switch unit 103, the power supply unit 104 and the control unit 105 (which are not shown in FIG. 11) shown in FIG. 1, the power supply system further includes N sets of alternating current electric equipment group 30, N sets of storage battery 40 and N sets of AC/DC converting module 60.

One set of storage battery 40 and AC/DC converting module 60 is provided for each alternating current electric equipment group 30. The first alternating current electric equipment group 30-1 is connected to the first storage battery 40-1 and the first AC/DC converting module 60-1 correspondingly, the second alternating current electric equipment group 30-2 is connected to the second storage battery 40-2 and the second AC/DC converting module 60-2 correspondingly, . . . , the N-th alternating current electric equipment group 30-N is connected to the N-th storage battery 40-N and the N-th AC/DC converting module 60-N correspondingly, where N is a natural number greater than 1. Operation processes and connection relationships with other functional modules in the power supply system of respective alternating current electric equipment groups 30 are the same as that described in FIG. 9 or FIG. 10. Each alternating current electric equipment group 30 may also include the main input terminal 31, the direct current input terminal 32 and the bypass input terminal 33, and the connection relationship and operation process thereof are the same as that described in FIG. 9 or FIG. 10.

In a case there are multiple alternating current electric equipment groups 30, the total power demand of all loads operating currently in the alternating current electric equipment group 30 refers to a total power demand of all loads operating currently among the first alternating current electric equipment group 30-1 to the N-th alternating current electric equipment group 30-N. The control module may determine whether the total power demand is greater than the instantaneous power of the oil engine 20 by detecting a total input current of the first alternating current electric equipment group 30-1 to the N-th alternating current electric equipment group 30-N; control the first storage battery 40-1 to the 40-N storage battery each to enter a discharging mode in a case that the total power demand is greater than the instantaneous power, where in this case each set of AC/DC converting module 60 and storage battery 40 supply power to a corresponding alternating current electric equipment group 30; and control the first storage battery 40-1 to the N-th storage battery 40-N each to enter a charging mode in a case that the total power demand is not greater than the instantaneous power. Where each set of AC/DC converting module 60 supply power to a corresponding alternating current electric equipment group 30 and charges a corresponding storage battery 40.

Sixth Embodiment

Figure 12:
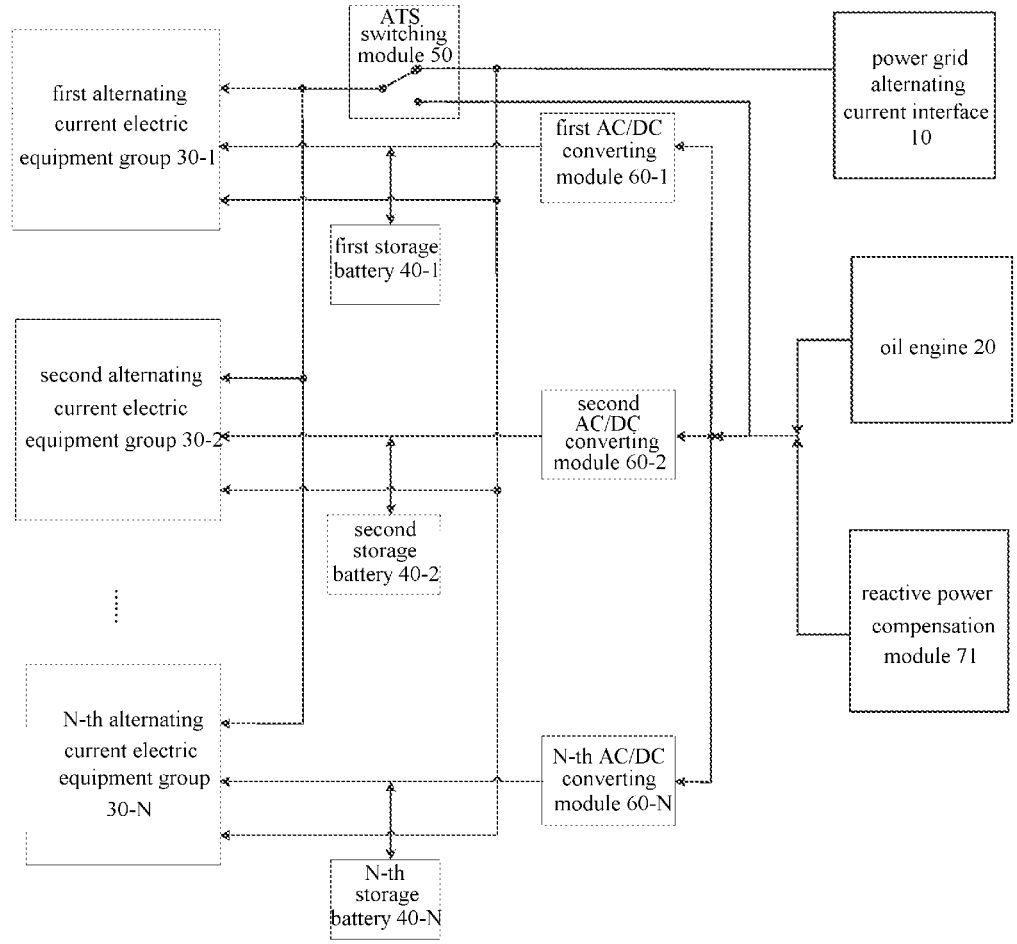
FIG. 12 shows a schematic structural diagram of a part of a power supply system according to a sixth embodiment of the present disclosure.

Referring to FIG. 12, another embodiment of the power supply system is further provided according to a sixth embodiment of the present disclosure. The power supply system according to the embodiment further includes a reactive power compensation module 71 connected to an output terminal of the oil engine 20 and configured to adjust a power factor of a load of the oil engine 20 when the oil engine operates, such that the load of the oil engine 20 presents resistive or weak inductive. When the oil engine 20 is started, the reactive power compensation module 71 directly connected to the output of the oil engine 20 may adjust the power factor of the load of the oil engine 20; and particularly for a lead load, the load may be adjusted to present resistive or weak inductive by the reactive power compensation module 71. For example, an input power factor of a standard oil engine expected load lags 0.8. In the sixth embodiment shown in FIG. 12, by the reactive power compensation module 71, the output of the oil engine 20 is connected to the ATS switching module 50 and respective AC/DC converting modules 60. By adjusting of the reactive power compensation module 71, a loading capacity of the oil engine 20 can be improved and a capacitive load can be avoided, such that the oil engine 20 outputs voltage resonance, improving the adaptive ability of the oil engine 20 to the capacitive load, and being beneficial to select an oil engine 20 with a small capacity.

A specific operation process of the power supply system shown in FIG. 12 is as follows.

1) When the power grid alternating current interface 10 outputs a normal alternating current, a power grid alternating current signal supplies power to the main input terminal 31 of each alternating current electric equipment group 30 and a charger in the alternating current electric equipment 30 charges the storage battery 40, so as to supply power when the power grid alternating current interface 10 outputs an abnormal alternating current.

2) When the power grid alternating current interface 10 outputs an abnormal alternating current, the alternating current electric equipment group 30 obtains energy from the storage battery 40 through the direct current input terminal 32.

After the oil engine 20 is started, the reactive power compensation module 71 directly connected to the output of the oil engine 20 may adjust the power factor of the load of the oil engine, and adjust the load to present resistive or weak inductive. By the reactive power compensation module 71, the output of the oil engine 20 is connected to the ATS switching module 50 and respective AC/DC converting modules 60.

By starting the AC/DC converting module 60, the alternating current input voltage of the oil engine 20 is converted into the direct current output. In this case, it is equivalent to that both the storage battery 40 and the AC/DC converting module 60 supply power to the alternating current electric equipment group 30.

If an inverter in the alternating current electric equipment group 30 is damaged, the system may switch to the bypass input terminal 33. The ATS switching module 50 selects to connect the output of the oil engine 20 to the bypass input terminal 33 of the alternating current electric equipment group 30, and the oil engine 20 supplies power through the ATS switching module 50.

3) When the power grid alternating current interface 10 recovers to output a normal alternating current, the main input terminal 31 of the alternating current electric equipment group 30 recovers to supply power, and the system switches to the main input terminal 31 for inputting. In this case, respective AC/DC convening modules 60 stop operating, and the oil engine 20 and the reactive power compensation module 71 may also stop operating. The whole system recovers to an initial state before powered off.

Figure 8:
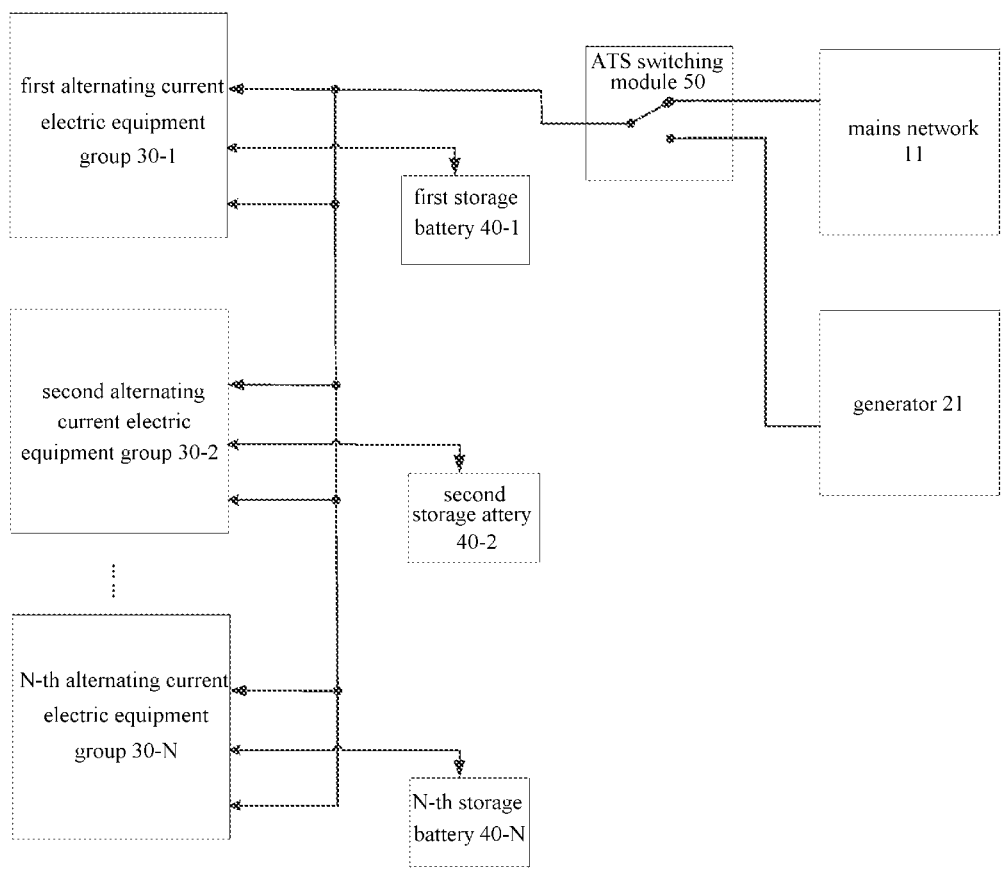
FIG. 8 shows a principle block diagram of a second embodiment of the conventional typical power distribution system.

In some embodiment of the present disclosure, the reactive power compensation module 71 may be added in the conventional power distributing system shown in FIG. 7 or FIG. 8 and connected to the output terminal of the oil engine 20, so as to improve the performance of the load of the oil engine through reactive power compensation, such that it is beneficial to select the diesel generator 20 with a small capacity.

In another embodiment of the present disclosure, the reactive power compensation module 71 may be replaced with a harmonic compensation module or a reactive power harmonic compensation module. The harmonic compensation module is connected to the output terminal of the oil engine 20, so as to handle harmonics in a circuit when the oil engine 20 operates. The reactive power harmonic compensation module functions of reactive power compensation and harmonic processing, and is connected to the output terminal of the oil engine 20, so as to handle harmonics in a circuit when the oil engine 20 operates and adjust the power factor of the load of the oil engine 20, such that the load of the oil engine 20 presents resistive or weak inductive.

In summary, the third embodiment to the sixth embodiment mainly focus on the following aspects 1. in the embodiment of the present disclosure, the AC/DC converting module 60 is added in the power supply system, the capability of the oil engine 20 is utilized at a greatest extent, thereby supplying power to the alternating current electric equipment group 30 such as the UPS system or other electric equipments while charging the storage battery 40. When the required power of the load is greater than the instantaneous power of the oil engine, both the storage battery 40 and the AC/DC converting module 60 supply power; and when the required power of the load is less than or equal to the instantaneous power of the oil engine, the AC/DC converting module 60 charges the storage battery 40 and supplies power to the load.

2. in the embodiment of the present disclosure, the reactive power compensation module 71 is cooperated with the oil engine 20 in the power supply system, and the performance of the load of the oil engine is improved by the reactive power compensation module 71, such that it is beneficial to select an oil engine set with a small capacity.

3. in the embodiment of the present disclosure, an ATS switching logic is put forward, when the power grid alternating current interface 10 outputs a normal alternating current, the ATS connects the bypass of the alternating current electric equipment group 30 to the power grid alternating current signal; and when the power grid alternating current interface 10 outputs an abnormal alternating current, the output of the oil engine 20 is connected to the bypass.

4. in the embodiment of the present disclosure, the switching logic of the power supply system is improved, including the switching logic after the power gird alternating current interface 10 outputs an abnormal alternating current and the recovering logic after the power grid alternating current interface 10 outputs a normal alternating current described above.

5. in the embodiment of the present disclosure, the configuration method of the oil engine 20 is improved, the oil engine 20 may be configured according to the actual active load demand required by the system. The oil engine 20 may be configured according to the actual active demand rather than the rated full loaded capacity of the alternating current electric equipment group 30.

6. in the present disclosure, by reducing the installed capacity of the oil engine 20, the capital investment (capex) is reduced effectively. Since the installed capacity of the oil engine 20 is reduced, the instantaneous power is controlled effectively, a cross section area of a cable may be smaller, a cost of the whole project is reduced, thereby reducing the capital investment. With the power supply system according to the embodiment of the present disclosure, the oil engine set is operated at the optimum operation power point, and oil consumption per unit of generating capacity is reduced, thereby reducing an operation cost (opex). Since the efficiency of the oil engine 20 is improved, carbon emission is reduced and it is more environmental protection when a certain power is provided.

Figure 13:
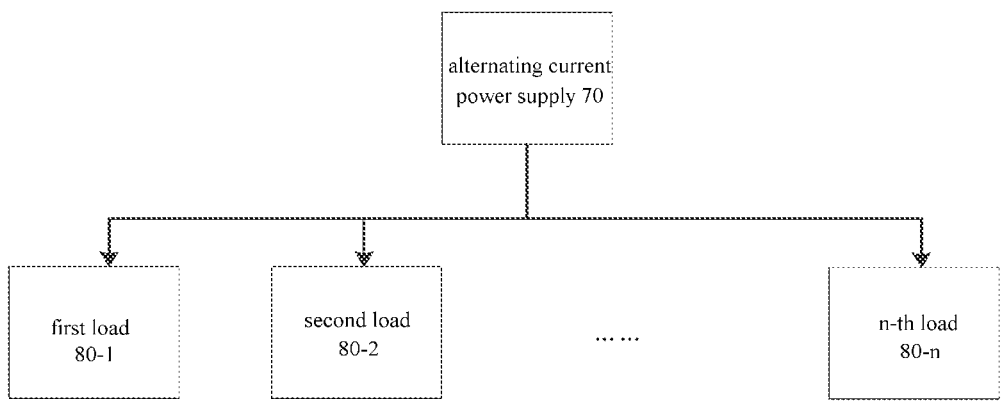
FIG. 13 shows a diagram illustrating a connection between an alternating current power supply and loads in a present power distribution system such as a machine room power distribution system.

FIG. 13 shows a diagram showing a connection between an alternating current power supply and loads in a present power distribution system such as a machine room power distribution system. An alternating current power supply 70 may be a diesel generator set configured to supply power to n loads connected to an output terminal thereof, for example a first load 804, a second load 80-2, . . . an n-th load 80-n. The n loads may be alternating current loads. In configuring the power of the diesel generator set, in an aspect, the capacity of the diesel generator set is configured as a certain times of the rated total capacity of the loads according to typical generator set design, generally 2 times; and in another aspect, a case that the n loads operate at their maximum power simultaneously needs to be considered, such that the system supplies power safely and reliably. However, at most of cases, the system does not operate at the maximum power, and the diesel generator set operates at a light load all the time, thereby resulting in wasting resources.

For a drawback that the power adaptive ability of the alternating current power supply in the conventional power distributing system is not strong, another power supply system and power supply method are further provided according to the embodiment of the present disclosure. The AC/DC module and its monitoring module are provided without increasing the input power, thereby improving the adaptive ability of the pulsed power and effectively increasing continuity of power supply of the system.

Seventh Embodiment

Another embodiment of the power supply system is further provided according to a seventh embodiment of the present disclosure, and the embodiment includes an AC/DC device. Hereinafter the AC/DC device and a power supply system including the AC/DC device in the embodiment of the present disclosure are described in detail in conjunction with FIG. 14.

Figure 14:
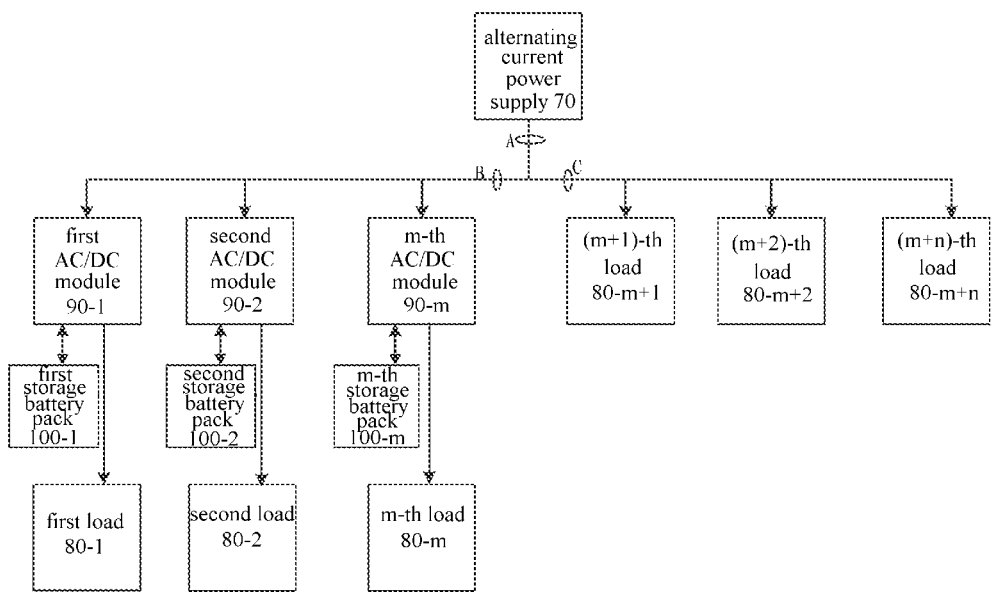
FIG. 14 shows a block diagram of a part of modules in a preferred embodiment of a power supply system according to a seventh embodiment of the present disclosure.

As shown in FIG. 14, another embodiment of the power supply system is further provided according to the seventh embodiment of the present disclosure. In addition to the power grid input unit 101, the oil engine input unit 102, the automatic transfer switch unit 103, the power supply unit 104 and the control unit 105 (which are not shown in FIG. 14) shown in FIG. 1, the power supply system further includes: an alternating current power supply 70, multiple loads and at least one storage battery pack, wherein the alternating current power supply 70 is an oil engine, for example a diesel generator set or a gasoline generator set. In the embodiment of the present disclosure, the oil engine input unit 102 outputs an alternating current signal using an oil engine.

When an abnormal alternating current is outputted by the power grid alternating current interface, the automatic transfer switch unit 103 connects the oil engine input unit 102 to the power supply unit 104, thereby providing an alternating current signal outputted by the oil engine input unit 102 to the power supply unit 104. The power supply unit 104 converts the alternating current signal outputted by the oil engine input unit 102 into a direct current signal, and supplies power to a current load using the direct current signal. Therefore, when an abnormal alternating current is outputted by the power grid alternating current interface, the alternating current power supply 70 supplies power to the multiple loads. The multiple loads may be the first load 80-1 to a (m+n)-th load 80-*m*+*n* in FIG. 14 for example.

When an abnormal alternating current is outputted by the power grid alternating current interface, the power supply unit 104 includes an AC/DC device.

The AC/DC device in the present disclosure includes a monitoring module (not shown in FIG. 14) and at least one AC/DC module. The at least one AC/DC module is configured correspondingly to at least one of the multiple loads and at least one storage battery.

For example, in the power supply system, an AC/DC module and a storage battery pack are provided correspondingly for at least one of the multiple loads. In FIG. 14, AC/DC modules and storage battery packs are provided for m loads, and the loads are referred to as a second load group including a first load 80-1, a second load 80-2, an m-th load 80-*m*. Accordingly, the remaining loads are referred to as a first load group, including an (m+1)-th load 80-*m*+1, an (m+2)-th load 80-*m*+2, . . . , an (m+n)-th load 80-*m*+*n*. In the present disclosure, an AC/DC module and a storage battery pack are provided for each load in the second load group. For example, a first AC/DC module 90-1 and a first storage battery pack 100-1 are provided for the first load 80-1, a second AC/DC module 90-2 and a second storage battery pack 100-2 are provided for the second load 80-2, . . . , and an m-th AC/DC module 90-*m* and an m-th storage battery pack 100-*m* are provided for the m-th storage battery pack 100-*m*. The AC/DC module is configured to convert an alternating current outputted by the alternating current power supply 70 into a direct current. When the system operates, it may be controlled such that power is supplied to the loads in the second load group by the corresponding AC/DC module, or by the corresponding storage battery pack, or by both the AC/DC module and the storage battery pack. The loads in the second load group may include an uninterrupted power supply and an electric equipment.

In the present disclosure, the monitoring module is connected to respective AC/DC modules, detects a total output current of the alternating current power supply 70, transmits an instruction to control an input power of the at least one AC/DC module according to the total output current of the alternating current power supply 70, such that the total output power of the alternating current power 70 is not higher than a preset power. The preset power is a value slightly lower than a rated power of the alternating current power supply. As the AC/DC module shown in FIG. 14, the modules have a function of AC/DC converting, and may control the input power in response to the instruction from the monitoring module, thereby controlling the total output power of the alternating current power supply 70. An input terminal of each AC/DC module is connected to an alternating current output terminal of the alternating current power supply 70 such as a diesel generator; the monitoring module determines whether to transmit an instruction to start the AC/DC module in the second load group by detecting the total output current of the alternating current power supply 70, for example a current at the point A in FIG. 14, and detects the total output current of the alternating current power supply in a real-time manner after the AC/DC module is started, thereby controlling the input power of each AC/DC module. For example, a current at the point B in FIG. 14 is controlled by adjusting an input current of each AC/DC module; and since a current at the point C does not change, thereby controlling the total output power of the whole alternating current power supply 70.

Specifically, the monitoring module is connected to an alternating current output terminal of the alternating current power supply 70; and is configured to detect the total output current of the alternating current power supply 70 when the system is started, and transmit an instruction to start each AC/DC module in a case that the total output current is less than a set value. In a preferred embodiment of the present disclosure, respective AC/DC modules may be started simultaneously or started one by one. Therefore, if the total output current of the alternating current power supply 70 is great, i.e., not less than the set value, when the system is started, respective AC/DC modules in the second load group are not started, and power is supplied to the loads in the second load group by the connected storage battery pack, thereby controlling the total output current of the alternating current power supply 70 not to exceed a preset power. If the total output current of the alternating current power supply 70 is small, i.e., greater than the set value, when the system is started, the alternating current power supply 70 can supply power to the loads in the second load group through the respective AC/DC modules, therefore the respective AC/DC modules may be started. In this case, the respective AC/DC modules may supply power to the loads in combination with the storage battery pack.

After transmitting the instruction to start the respective AC/DC modules, the monitoring module may control the respective AC/DC modules to increase an input power thereof, such that the total output current of the alternating current power supply 70 gradually increases, thereby avoiding that the total output power of the alternating current power supply 70 increases suddenly and exceeds the preset power. The monitoring module continuously detects whether the total output current of the alternating current power supply 70 is less than the set value; transmits an instruction to respective AC/DC modules to gradually increase the input power thereof in a case that the total output current is less than the set value, such that the total output current of the alternating current power supply 70 increases; and transmits an instruction to the respective AC/DC modules to gradually decrease the input power thereof in a case that the total output current is not less than the set value, such that the total output current of the alternating current power supply 70 decreases. That is, the control process needs to meet a requirement that the total output power of the alternating current power supply 70 is not higher than the set value. Preferably, the control process needs to meet another control condition, i.e., after the input power of the respective AC/DC modules are increased, a requirement for a charging current rate of the connected storage battery pack needs to be met in addition to meeting the requirement of the connected load, that is, not greater than a preset charging current rate of the storage battery pack. In a preferred embodiment of the present disclosure, the monitoring module may reduce an input power of one or more of the respective AC/DC modules randomly, thereby reducing the total output current of the alternating current power supply 70. In another preferred embodiment of the present disclosure, the monitoring module may reduce an input power of respective AC/DC modules by average, thereby reducing the total output current of the alternating current power supply 70.

In a preferred embodiment of the present disclosure, after the respective AC/DC modules are started, the respective AC/DC modules may supply power to the loads in combination with the storage battery pack. In this case, a charging and discharging state of the storage battery pack may be controlled according to actual cases. The monitoring module in the present disclosure may adjust the input power of the respective AC/DC modules according to a principle of balance. The monitoring module may collect output current states of respective AC/DC modules and input current states of the loads connected to the respective AC/DC modules. The monitoring module controls input power of respective AC/DC modules, so as to ensure that the output current of the AC/DC module is greater than or equal to the input current of the loads and the battery does not discharge excessively. That is, if a preset power of the alternating current power supply 70 can meet the demand of the all loads, the input power of the respective AC/DC modules are balanced and the storage battery is not started as much as possible to supply power. If the preset power of the alternating current power supply 70 can meet the demand of all loads and there is remaining power, the AC/DC modules may charge the storage battery pack connected thereto. If the preset power of the alternating current power supply 70 can not meet the demand of all loads, the monitoring module controls the AC/DC module to start the connected storage battery pack to supply power in a combined manner.

If the storage battery pack and the AC/DC modules are started in the system to supply power in a combined manner, the monitoring module according to the present disclosure may determine how to adjust the input power of the AC/DC module connected to each storage battery pack according to the remaining electric quantity of the storage battery pack. After the respective AC/DC modules are started, remaining electric quantities of respective storage battery packs are detected, the storage battery packs are ranked in an ascending order according to the remaining electric quantities, one or more storage battery packs with the lowest remaining electric quantity are selected, and an input power of AC/DC modules connected to the one or more storage battery packs is increased. For example, one storage battery pack with the lowest remaining electric quantity may be selected; the first AC/DC module 90-1 detects that the first storage battery pack 100-1 has the lowest electric quantity, and the monitoring module may control the first AC/DC module 904 to increase the input current, so as to ensure safe and reliable operation of the first load 80-1. For example, two storage battery packs with the lowest electric quantity may be selected, and an input power of AC/DC modules connected to the two storage battery packs is increased. In the present disclosure, the monitoring module schedules in a centralized manner, the input power of respective AC/DC modules are allocated reasonably, and it is ensured that the storage batteries in the whole power distribution system are utilized most sufficiently, thereby utilizing the alternating current power supply 70 such as the diesel generator effectively and ensuring reliable power supply.

In the present disclosure, after transmitting an instruction to start the AC/DC modules, the monitoring module may further allocate input power according to priorities of loads connected to the AC/DC modules. That is, the system may set importance of respective direct current loads, so as to ensure that power is supplied continuously for important loads. For a load with a low priority, when the total output power of the alternating current power supply is equal to or close to a rated value, an AC/DC module connected to the load is controlled to reduce an input power, so as to ensure that an AC/DC module connected to a load with a high priority supplies power.

Figure 15:
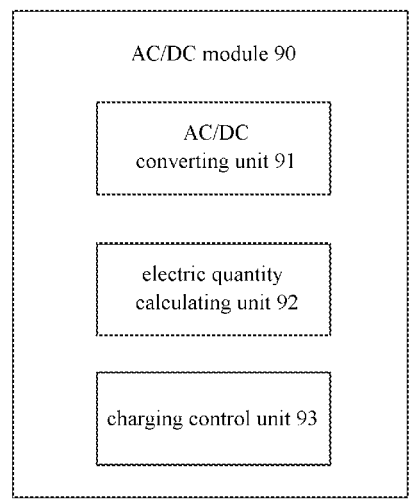
FIG. 15 shows a schematic diagram of an AC/DC module in an AC/DC device according to a preferred embodiment of the present disclosure.

Reference is made to FIG. 15 which shows a schematic diagram of an AC/DC module in an AC/DC device according to a preferred embodiment of the present disclosure. As shown in FIG. 15, an AC/DC module 90 in the embodiment includes at least an AC/DC converting unit 91 and an electric quantity calculating unit 92.

The AC/DC converting unit 91 is configured to convert an alternating current outputted by the alternating current power supply 70 into a direct current. The electric quantity calculating unit 92 is configured to detect a remaining electric quantity of a storage battery pack connected thereto and transmit the detected electric quantity to a monitoring module.

The AC/DC module 90 may further include a charging control unit 93 configured to control charging and discharging of a storage battery pack connected thereto.

In a preferred embodiment of the present disclosure, the AC/DC module 90 may further include a battery life calculating unit configured to calculate a battery life of a storage battery pack connected thereto and transmit the battery life to the monitoring module. In addition, the AC/DC module 90 may further have the following features:

1) when a voltage and a frequency can be started within a certain normal range, a stable output power can be ensured even if the voltage and the frequency change quickly;
2) when an input voltage falls instantaneously, an output power can be limited;
3) when a shock load is output, the maximum instantaneous input power does not exceed K times of the output load, where generally 1<K<3; and
4) when the input voltage is abnormal and the system is turned off, the system may start normally and recover to supply power when the input voltage recovers normal.

Eighth Embodiment

Another embodiment of the power supply method is further provided according to an eighth embodiment of the present disclosure. The method is applied to a power supply system. The power supply system includes an alternating current power supply 70, multiple loads to which power is supplied h the alternating current power 70, at least one storage battery pack and at least one AC/DC module. The alternating current power supply 70 is an oil engine, for example a diesel generator set or a gasoline generator set.

The power supply system may be the power supply system shown in the seventh embodiment and meet the following condition. When an abnormal alternating current is outputted by the power grid alternating current interface, the alternating current power supply 70 supplies power to the multiple loads; and when the power grid alternating current interface outputs an abnormal current, the power supply unit 104 includes an AC/DC device.

The multiple loads are the first load 80-1 to the (m+n)-th load **80-*m+n* in FIG. 14 for example. An AC/DC module and a storage battery pack are provided correspondingly for at least one of the multiple loads, where the AC/DC module is configured to convert an alternating current outputted by the alternating current power supply 70** into a direct current to supply power to a connected load. Power may be supplied to the load by the storage battery pack only or by both the AC/DC module and the storage battery pack.

In addition to the power supply method provided in the second embodiment, the power supply method according to the present disclosure further includes a control method. The control method includes the following steps: detecting a total output current of the alternating current power supply 70, and transmitting an instruction to control an input power of respective AC/DC modules according to the total output current of the alternating current power supply 70, such that the total output power of the alternating current power supply is not higher than a preset power. The preset power is a value slightly lower than a rated power of the alternating current power supply. For example, the system may determine whether to transmit an instruction to start AC/DC modules in a second load group by detecting the total output current of the alternating current power supply, for example the current at the point A in FIG. 14, detect the total output current of the alternating current power supply in a real-time manner after the AC/DC modules are started, thereby controlling input power of respective AC/DC modules. For example, the current at the point B in FIG. 14 is controlled by adjusting an input current of respective AC/DC modules, thereby controlling the total output power of the whole alternating current power supply 70, A product of the AC/DC device in the present disclosure may be packaged and used in multiple ways. For example, the monitoring modules may be disposed in respective AC/DC modules, and communicate with each other in use to achieve overall control. The monitoring module may be independent from the AC/DC modules and function as a total monitoring module of the power distribution system, thereby controlling all AC/DC modules.

Figure 16:
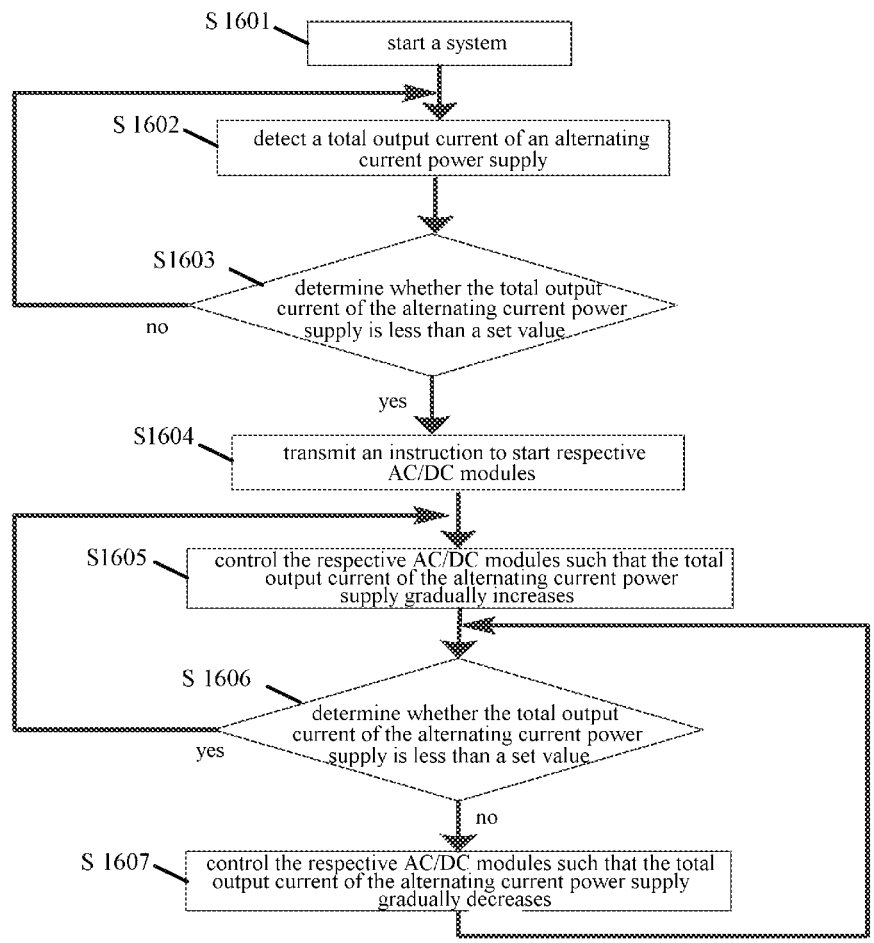
FIG. 16 shows a flowchart of a control method according to a preferred embodiment of the present disclosure.

Reference is made to FIG. 16 which shows a flowchart of a control method according to a preferred embodiment of the present disclosure. As shown in FIG. 16, the control method according to the embodiment includes step S1601 to step S1607 in the following.

Firstly, in step S1601, a system is started.

Subsequently, in step S1602, a total output current of an alternating current power supply 70 is detected.

Subsequently, in step S1603, it is determined whether the total output current of the alternating current power supply 70 is less than a set value, the method proceeds to step S1604 in a case that the total output current is less than the set value; and otherwise, the method proceeds to step S1602, i.e., continuously detecting and determining whether the total output current of the alternating current power supply 70 is less than the set value.

Subsequently, in step S1604, an instruction is transmitted to start respective AC/DC modules. In a preferred embodiment of the present disclosure, the respective AC/DC modules may be started simultaneously or started one by one. Therefore, if the total output current of the alternating current power supply 70 is great, i.e., not less than the set value, when the system is started, respective AC/DC modules in the second load group are not started, and power may be supplied to loads in the second load group by a connected storage battery pack, thereby controlling the total output current of the alternating current power supply 70 not to exceed the preset power. If the total output current of the alternating current power supply 70 is small, i.e., greater than the set value, when the system is started, the alternating current power supply 70 can supply power to the loads in the second load group through respective AC/DC modules, therefore the respective AC/DC modules may be started. In this case, each AC/DC module may independently supply power to a connected load, or supply power to the load in combination with the storage battery pack.

Subsequently, in step S1605, after the instruction is transmitted to start respective AC/DC modules, the respective AC/DC modules are controlled such that the total output current of the alternating current power supply gradually increases, so as to avoid that the total output power of the alternating current power supply 70 increases suddenly and exceeds the preset power. When increasing the total output current of the alternating current power supply, this step needs to meet another control condition, i.e., after the input power of the respective AC/DC modules are increased, a requirement of a charging current rate of a connected storage battery pack needs to be met in addition to supplying power to the loads, that is, not greater than a preset charging current rate of the storage battery pack.

Subsequently, in step S1606, it is detected whether the total output current of the alternating current power supply is less than a set value; the method proceeds to step S1605, an instruction is transmitted to respective AC/DC modules to gradually increase an input power such that the total output current of the alternating current power supply increases, if the total output current is less than the set value; otherwise, the method proceeds to step S1607. In a preferred embodiment of the present disclosure, the system may randomly reduce an input power of one or more of the respective AC/DC modules, thereby reducing a total output current of the alternating current power supply 70. In another preferred embodiment of the present disclosure, the system may reduce input power of respective AC/DC modules by average, thereby reducing the total output current of the alternating current power supply 70.

In a preferred embodiment of the present disclosure, after the respective AC/DC modules are started, the system may control the AC/DC modules to supply power to the loads in combination with the storage battery pack. In this case, a charging and discharging state of the storage battery pack may be controlled according to actual cases. The input power of the respective AC/DC modules is adjusted using the control method for the power distribution system of the present disclosure according to a principle of balance. In the control method, output current states of respective AC/DC modules and input current states of loads connected to the AC/DC modules may be collected. The input power of the respective AC/DC modules are controlled, so as to ensure that the output current of the AC/DC module is greater than or equal to the input current of the load and the battery does not discharge excessively. That is, if a preset power of the alternating current power supply 70 can meet a demand of all loads, the input power of respective AC/DC modules are balanced, such that the storage battery pack is not started as much as possible to supply power. In addition, if the preset power of the alternating current power supply 70 can meet the demand of all loads and there is remaining power, the AC/DC module may charge a connected storage battery pack. If the preset power of the alternating current power supply 70 can not meet the demand of all loads, the system controls the AC/DC module to start the connected storage battery pack to supply power in a combined way.

Subsequently, in step S1607, an instruction is transmitted to respective AC/DC modules to gradually decrease an input power thereof, such that the total output current of the alternating current power supply decreases, and the method proceeds to step S1606, it is detected again. The flow may end when the system stops.

In the step S1607 descried above, if the storage battery pack and the AC/DC module are started in the system to supply power in a combined manner, with the control method according to the present disclosure, how to adjust the input power of the AC/DC module connected to each storage battery pack may be determined according to the remaining electric quantity of the storage battery pack. After the respective AC/DC modules are started, remaining electric quantities of respective storage battery packs are detected, the storage battery packs are ranked in an ascending order according to the remaining electric quantities, one or more storage battery packs with the lowest remaining electric quantity are selected, and an input power of AC/DC modules connected to the one or more storage battery packs is increased. For example, one storage battery pack with the lowest remaining electric quantity may be selected; the first AC/DC module 90-1 detects that the first storage battery pack 100-1 has the lowest electric quantity, and the monitoring module may control the first AC/DC module 90-1 to increase the input current, so as to ensure safe and reliable operation of the first load 80-1. For example, two storage battery packs with the lowest electric quantity may be selected, and an input power of AC/DC modules connected to the two storage battery packs is increased. In the control method of the present disclosure, it is scheduled in a centralized manner, the input power of respective AC/DC modules are allocated reasonably, and it is ensured that the storage batteries in the whole power distribution system are utilized most sufficiently, thereby utilizing the alternating current power supply 70 such as the diesel generator effectively and ensuring reliable power supply.

In the control method of the present disclosure, after transmitting an instruction to start the AC/DC modules, input power may be further allocated according to priorities of loads connected to the AC/DC modules. That is, the system may set importance of respective direct current loads, so as to ensure that power is supplied continuously for important loads. For a load with a low priority, when the total output power of the alternating current power supply is equal to or close to a rated value, an AC/DC module connected to the load is controlled to reduce an input power, so as to ensure that an AC/DC module connected to a load with a high priority supplies power.

In order to ensure reliability of the system, the conventional power distribution system for example a machine room power distribution system generally have a multi-path input power supply. The generator for example a diesel generator is generally an essential selection, but the diesel generator has a great volume and a high investment. In configuring the diesel generator, in addition to considering cooperation between the diesel generator and the power factor of the loads, it needs to consider a case that all loads operate at the maximum power. However, in most of time, respective loads doe not operate at the maximum power, and actually the configuration of the diesel generator is far greater than the demand of the output average power, resulting in waste of fields and capital.

Figure 17:
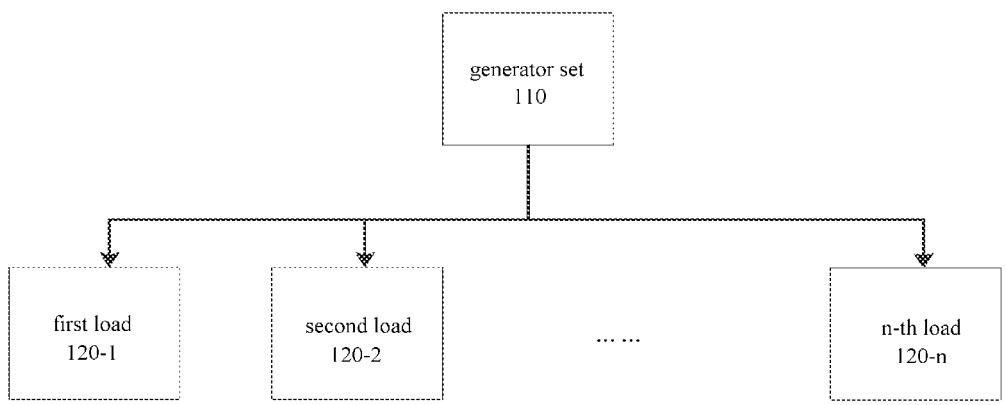
FIG. 17 is a diagram showing a connection between a generator set and loads in a present machine room power distribution system.

FIG. 17 shows a diagram illustrating a connection between generator sets and loads in a power distribution system of the present machine room. A generator set 110 may be a diesel generator set configured to supply power to n loads connected to an output terminal of the generator set 110, for example a first load 120-1, a second load 120-2, . . . , and an n-th load 120-n. The n loads may be alternating current loads. In configuring the power of the diesel generator set 110, in an aspect, the capacity of the diesel generator set 110 is configured as a certain times of the rated total capacity of the loads according to typical generator set design; and in another aspect, a case that the n loads operate at their maximum power simultaneously needs to be considered, such that the system supplies power safely and reliably. However, at most of cases, the system does not operate at the maximum power, and the diesel generator set 110 operates at a light load all the time, thereby resulting in wasting resources.

Figure 18:
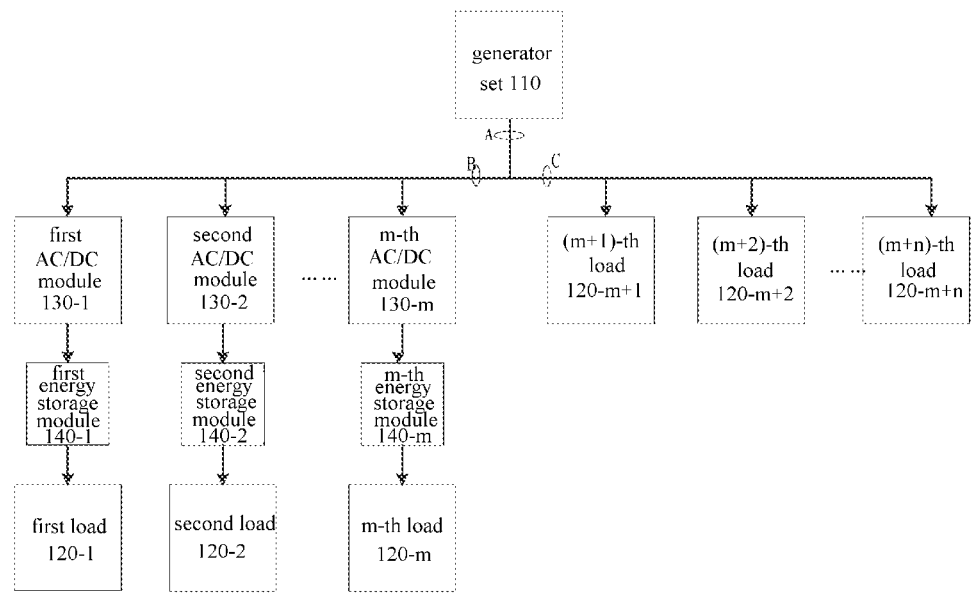
FIG. 18 shows a block diagram of a part of modules of a flexible power supply system according to a ninth embodiment of the present disclosure.

For a drawback that resources is wasted due to the high configuration of the generator set capacity of the existing power distribution system, another power supply system is further provided according to an embodiment of the present disclosure Ninth Embodiment Referring to FIG. 18, another embodiment of the power supply system is further provided according to a ninth embodiment of the present disclosure. In the embodiment, the power supply system is a flexible power supply system. As shown in FIG. 18, in addition to the power grid input unit 101, the oil engine input unit 102, the automatic transfer switch unit 103, the power supply unit 104 and the control unit 105 (which are not shown in FIG. 18) shown in FIG. 1, the flexible power supply system further includes:

a generator set 110 and multiple loads. The generator set 110 is an oil engine, for example a diesel generator set or a gasoline generator set. In the embodiment of the present disclosure, the oil engine input unit 102 outputs an alternating current signal using the oil engine.

When an abnormal alternating current is outputted by the power grid alternating current interface, the generator set 110 supplies power to the multiple loads. The multiple loads are a first load 120-1 to a (m+n)-th load **120-*m*+*n* in FIG. 18 for example. In the present disclosure, the multiple loads are grouped into a first load group and a second load group. As shown in FIG. 18, the first load group includes n loads, i.e., an (m+1)-th load 120-*m*+1, an (m+2)-th load 120-*m*+2, . . . , an (m+n)-th load 120-*m*+*n*; and the second load group includes m groups, i.e., a first load 120-1, a second load 120-2, . . . , and an m-th load 120-*m***.

The flexible power supply system according to the present disclosure may further include an AC/DC module and an energy storage module provided correspondingly for each load in the second load group. For example, a first AC/DC module 130-1 and a first energy storage module 140-1 are provided for the first load 120-1, a second AC/DC module 130-2 and a second energy storage module 140-2 are provided for the second load 120-2, . . . , and an m-th AC/DC module **130-*m* and an m-th energy storage module 140-*m* are provided for the m-th energy storage module 140-*m*. The AC/DC module is configured to convert an alternating current outputted by the generator set 110 into a direct current. After the generator set 110** is started, the AC/DC modules are started according to a preset condition.

The flexible power supply system according to the present disclosure further includes a control module (not shown in FIG. 18) configured to detect a total output power of the generator set during a time period when the system operates; control the AC/DC module in the second load group to supply power to a corresponding load in combination with the energy storage module when it is determined that the total output power of the generator set 110 reaches a preset power, so as to control the total output power of the generator set not to be higher than a rated power. The control module further increases an input power of the second load group when it is determined that the total output power of the generator set 110 is lower than a preset power; and control the AC/DC module to store energy for the energy storage module when supplying power to a corresponding load. When increasing the input power of the second load group, the control module should ensure that the total output power of the generator set 110 is not higher than the rated power. In a preferred embodiment of the present disclosure, the preset power described above may be 70% to 100% of the rated power of the generator set 110.

The flexible power supply system according to the embodiment has the following beneficial effects. In the embodiment, the load in the second load group is converted into a flexible load by providing the AC/DC module and the energy storage module for the load, and the total output power of the generator set is controlled to be balanced by adjusting the input power of the flexible load, such that a low capacity configuration of the generator set is implemented, thereby improving utilization of the generator set.

In a preferred embodiment of the present disclosure, the control module may determine the output power of the generator set 110 by detecting the total output current of the generator set 110. As shown in FIG. 18, it is assumed that a total output current at an output terminal of the generator set 110, i.e., a current of the point A, is I_A, a total input current of the first load group, i.e., a current of the point C, is I_C,
and a total input current of the second load group, i.e., a current of the point B, is I_B, the following current formula can be obtained: I_A=I_B+I_C. When more loads in the first load group are used or the load power demand increases, the total input current I_C of the first load group increases, and the total output current I_A of the generator set 110 increases accordingly. The control module may determine that the output power of the generator set 110 reaches a preset power when detecting that the total output current I_A of the generator set 110 reaches a preset current. In this case, the control module may transmit a signal to respective energy storage modules to switch to a discharging state, for example, the first energy storage module 140-1 to the m-th storage module **140-*m* supply power to the connected load respectively. Since in this case respective energy storage modules combine with the AC/DC modules to supply power to the respective loads, the control module may control the respective AC/DC modules such that the total input current I_B of the second load group reduces, so as to reduce the total output current I_A of the generator set 110, such that the total output power of the generator set 110** is not higher than the rated power.

Accordingly, the control module determines that the output power of the generator set 110 is lower than the preset power when detecting that the total output current I_A is less than the preset current described above. The control module may transmit a signal to respective energy storage modules to switch to a charging state, and controls the respective AC/DC modules such that the total input current I_B of the second load group increases, such that the respective AC/DC modules charge the energy storage modules when supplying power to the respective loads. For example, the first AC/DC module 130-1 charges the first energy storage module 140-1 when supplying power to the first load 120-1. When increasing the total input current I_B of the second load group, the control module should ensure that the total output current I_A of the generator set 110 is not higher than the preset current described above, such that the total output power is not higher than the rated power.

In a preferred embodiment of the present disclosure, when determining whether the total output power of the generator set 110 reaches the preset power, one or more sets of AC/DC modules and the energy storage modules in the second load group may be controlled to supply power to respective loads as needed. When determining whether the total output power of the generator set 110 is lower than the preset power, one or more sets of AC/DC modules may be adjusted to store energy to the energy storage modules when supplying power to respective loads as needed.

According to the above solution of the present disclosure, a flexible power supply system is provided, thereby converting a part of common loads into flexible loads. In the present disclosure, the first load group includes common rigid loads, i.e., loads of which the input power can not be adjusted; and in the second load group, the loads are converted into flexible loads by providing the AC/DC modules and the energy storage modules. The flexible load refers to a load of which the input current is adjustable. When the load power does not change or increase, and the input power is required to be reduced, the flexible load may compensate the energy difference by the energy storage module. When the input energy can meet the demand, energy is supplemented to the energy storage module.

When load sudden increase occurs in the n loads in the first load group, the power input of the flexible loads, i.e., the second load group, may be reduced quickly, so as to maintain the total output current, such that the total input power of the first load group and the second load group does not exceed the rated power of the generator set 110. The flexible load obtains energy from its energy storage module. When the input power of the rigid loads of the first load group is reduced, the input current of the flexible loads is increased, such that power is supplied to a later level of loads and energy is supplemented to the energy storage module in the flexible load. In this way, an effect of "load shifting" can be effectively realized, such that a low capacity configuration of the generator set 110 is implemented, thereby improving utilization of the generator set 110. Typically, for example the load in the first load group is an air conditioner device. The temperature when the air conditioner operates changes or a temperature field changes, an operation efficiency of a compressor changes, and a difference of the operation efficiency may be up to above 20%. If the input power of the flexible load is reduced by 20% when the air conditioner operates at a maximum power, a rated power configuration of the generator set 110 can be reduced without changing the total output power of the generator set 110. It should be noted that, in configuring the generator set 110, the output power of the generator set 110 needs to be slightly greater than the average power of the system, so as to maintain energy conservation.

In some preferred embodiments of the present disclosure, the energy storage module of the flexible power supply system is a storage battery. The energy storage module may also be a device which can store and release energy. In another preferred embodiments of the present disclosure, the loads in the second load group may be an alternating and direct current dual power supply electric equipment. The alternating and direct current dual power supply electric equipment may be any device to which power is supplied by the input of the alternating and direct current dual power supplies.

Figure 19:
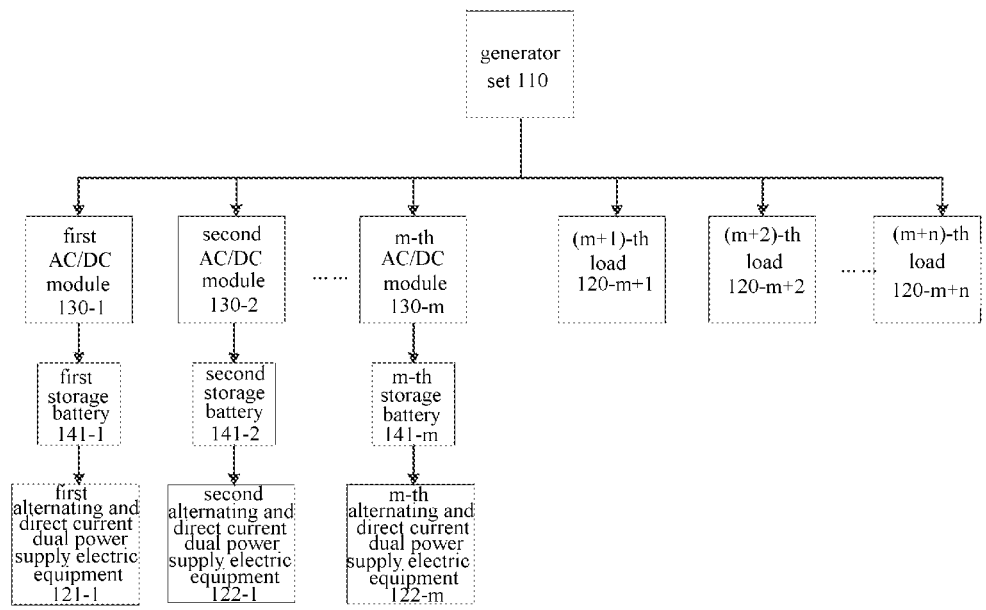
FIG. 19 shows a block diagram of a part of modules of a flexible power supply system according to a tenth embodiment of the present disclosure.

Reference is made to FIG. 19 which shows a block diagram of a part of modules of a flexible power supply system according to a tenth embodiment of the present disclosure. In the flexible power supply system according to the embodiment, the energy storage module connected to the AC/DC module is a storage battery, for example a first storage battery 141-1, a second storage battery 141-2, . . . an m-th storage battery 141-$m$ in FIG. 19. The load in the second load group is an alternating and direct current dual power supply electric equipment, for example, a first alternating and direct current dual power supply electric equipment 121-1, a second alternating and direct current dual power supply electric equipment 121-2, . . . , and an m-th alternating and direct current dual power supply electric equipment 121-$m$.

Figure 20:
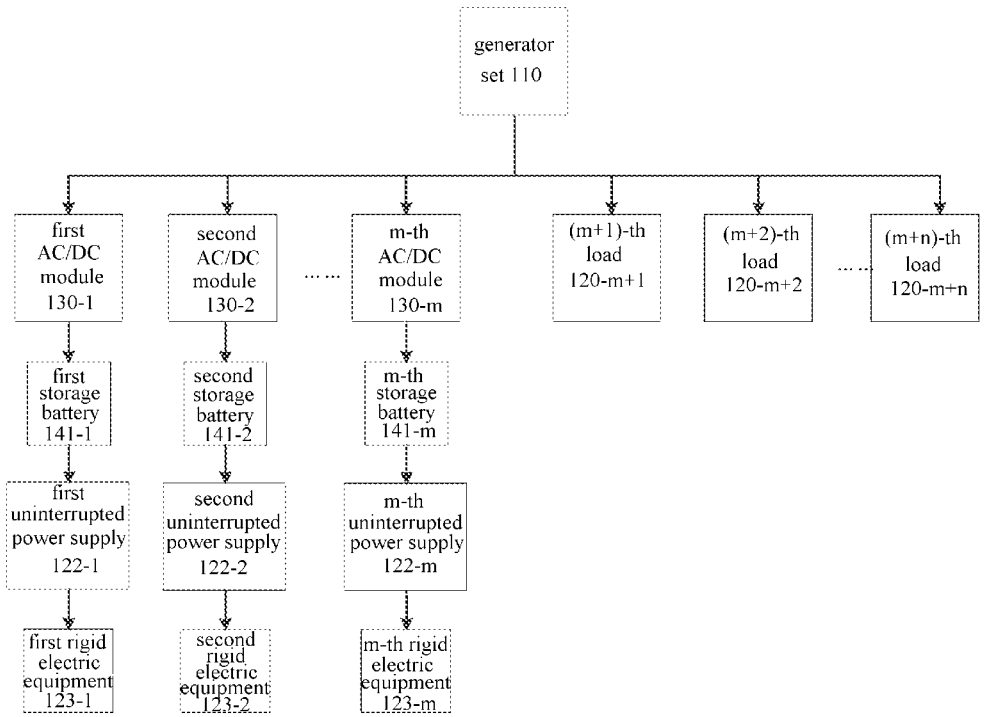
FIG. 20 shows a block diagram of a part of modules of a flexible power supply system according to an eleventh embodiment of the present disclosure.

Reference is made to FIG. 20 which shows a block diagram of a part of modules of a flexible power supply system according to an eleventh embodiment of the present disclosure. In the flexible power supply system according to the present disclosure, the loads in the second load group are uninterrupted power supplies and rigid electric equipments connected thereto. As shown in FIG. 20, the uninterrupted power supplies connected to the storage batteries are respectively a first uninterrupted power supply 122-1, a second uninterrupted power supply 122-2, . . . , and an m-th uninterrupted power supply 122-$m$. Corresponding rigid electric equipments are connected to the uninterrupted power supplies, for example a first rigid electric equipment 123-1, a second rigid electric equipment 123-2, . . . , and an m-th rigid electric equipment 123-$m$. The rigid electric equipment has a rigid requirement of the input power, i.e., the input power is not adjustable. The rigid electric equipment may be various direct current loads without energy storage components, for example IT key devices in a data machine room, such as a server.

The uninterrupted power supply generally includes a main input terminal, a bypass input terminal and a direct current input terminal. The main input terminal may be a three-phase, a bi-phase or a single-phase system. The bypass input terminal may be a three-phase, a bi-phase or a single-phase system. The main input terminal supplies power with a priority. When the main power supply is abnormal, the uninterrupted power supply supplies power by the direct current input terminal, and the bypass input terminal functions as a backup power supply when both the main input terminal and the direct current input terminal are powered down or abnormal. In the present disclosure, the direct current input terminal of the uninterrupted power supply may be connected to the AC/DC module to provide a direct current power supply.

Figure 21:
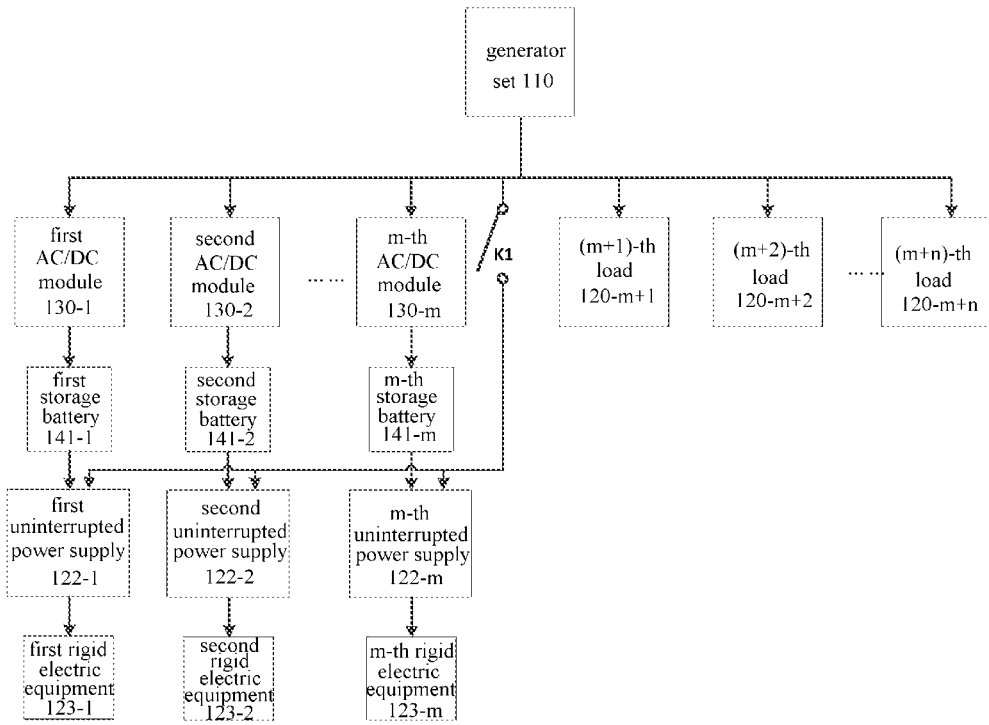
FIG. 21 shows a block diagram of a part of modules of a flexible power supply system according to a twelfth embodiment of the present disclosure.

Reference is made to FIG. 21 which shows a block diagram of a part of modules of a flexible power supply system according to a twelfth embodiment of the present disclosure. In the flexible power supply power according to the embodiment, a bypass input terminal of an uninterrupted power supply is coupled to an output terminal of the generator set 110 through a first switch K1. As shown in FIG. 21, bypass input terminals of a first uninterrupted power supply 122-1 to an m-th uninterrupted power supply 122-$m$ each are connected to the output terminal of the generator set 110 through the first switch K1. The first uninterrupted power supply 122-1 to the m-th uninterrupted power supply 122-$m$ may be connected to corresponding AC/DC modules through the main input terminal or the direct current input terminal. Therefore, when the AC/DC module outputs abnormally or an inverting module in the direct current input terminal is abnormal, the generator set 110 may be connected to the bypass input terminal to function as a backup power supply. It should be noted that, the first switch K1 may be a single-phase, a bi-phase or a three-phase switch.

Figure 22:
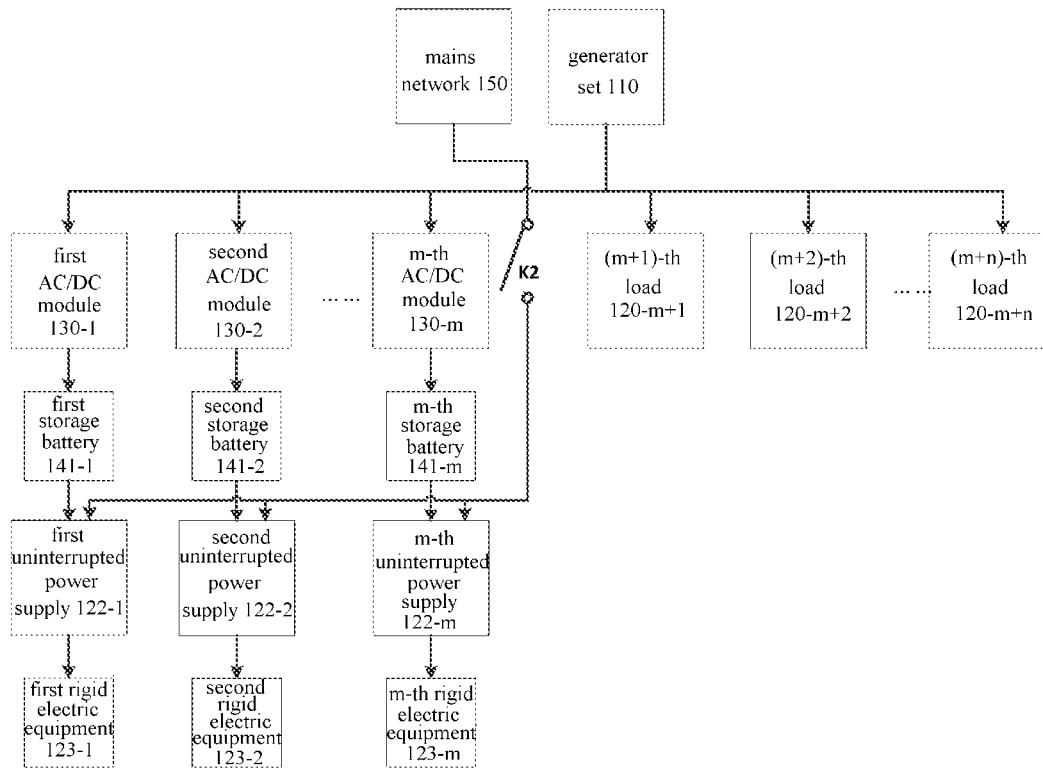
FIG. 22 shows a block diagram of a part of modules of a flexible power supply system according to a thirteenth embodiment of the present disclosure.

Reference is made to FIG. 22 which shows a block diagram of a part of modules of a flexible power supply system according to a thirteenth embodiment of the present disclosure. In the flexible power supply system according to the embodiment, a mains network 150 is further included, and a main input terminal of an uninterrupted power supply is coupled to an output terminal of the mains network 150 through a second switch K2.

In the embodiment of the present disclosure, the power grid input unit 101 provides an interface for connecting a power grid alternating current signal, i.e. for connecting to the mains network. Therefore, the main input terminal of the uninterrupted power supply is coupled to the interface for the power grid alternating current signal actually through the second switch K2.

In FIG. 22, the main input terminals of the first uninterrupted power supply 122-1 to the m-th uninterrupted power supply 122-$m$ each are connected to the output terminal of the mains network 150 through the second switch K2. In this case, the first uninterrupted power supply 122-1 to the m-th uninterrupted power supply 122-$m$ may be connected to corresponding AC/DC modules through a direct current input terminal or a bypass input terminal. Therefore, when the mains network 150 is abnormal, i.e., the power grid alternating current interface outputs an abnormal alternating current, the generator set 110 may be started and the generator set 110 is connected to the direct current input terminal through the AC/DC module to supply power. A total power of the generator set 110 is maintained at a certain level by controlling an input power of the second load group, such that the generator set 110 is efficiently utilized effectively and has low capacity configuration. It should be noted that, the second switch K2 may be a single-phase, a dual-phase or a three-phase switch.

Figure 23:
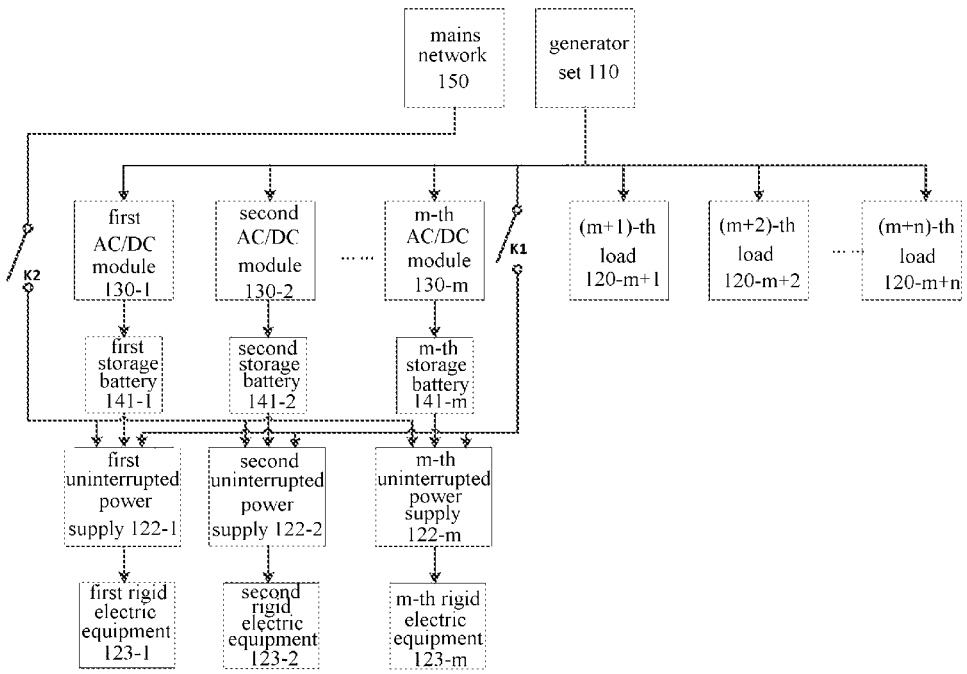
FIG. 23 shows a block diagram of a part of modules of a flexible power supply system according to a fourteenth embodiment of the present disclosure.

Reference is made to FIG. 23 which is a diagram of a part of modules of a flexible power supply system according to a fourteenth embodiment of the present disclosure. In the flexible power supply system according to the embodiment, a main input terminal of an uninterrupted power supply is coupled to an output terminal of a mains network 150 through a second switch K1, a direct current input terminal of the uninterrupted power supply is connected to a corresponding AC/DC module, and a bypass input terminal of the uninterrupted power supply is coupled to an output terminal of the generator set 110 through the first switch K1. Therefore, when the mains network 150 is abnormal, the generator set 110 may be started, and the generator set 110 is connected to the direct current input terminal through the AC/DC module to supply power. When the AC/DC module outputs abnormally or an inverting module in the direct current input terminal is abnormal, the generator set 110 may be directly connected to the bypass input terminal so as to function as a backup power supply.

Figure 24:
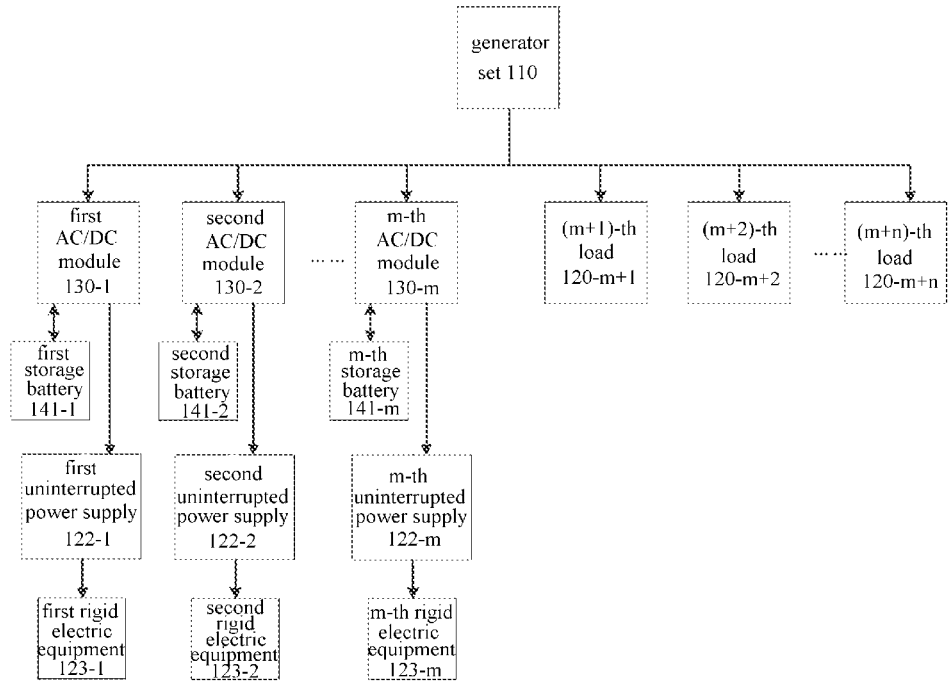
FIG. 24 shows a block diagram of a part of modules of a flexible power supply system according to a fifteenth embodiment of the present disclosure.
Figure 25:
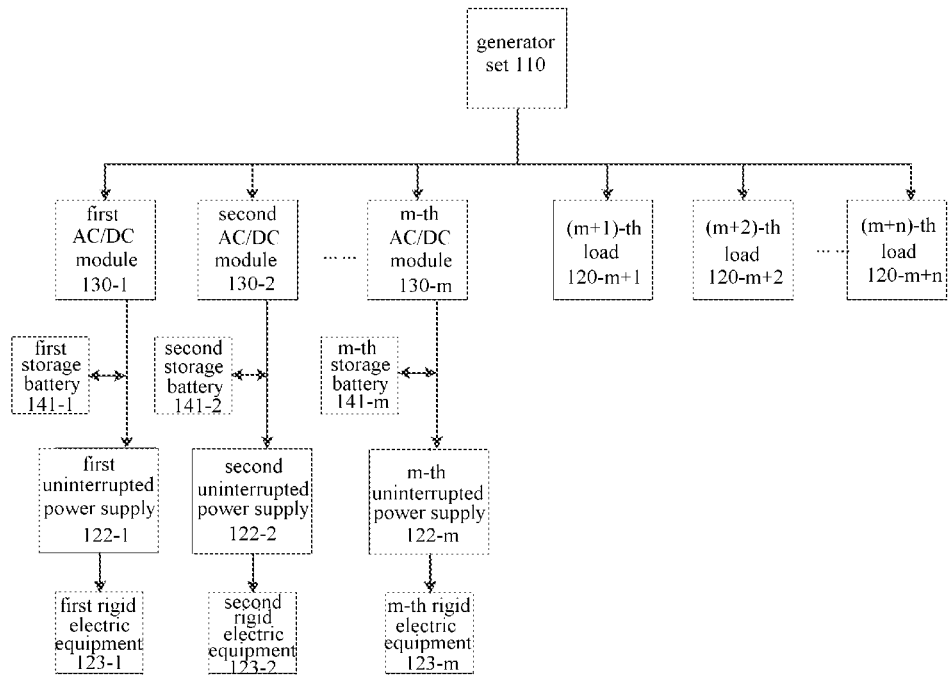
FIG. 25 shows a block diagram of a part of modules of a flexible power supply system according to a sixteenth embodiment of the present disclosure.
Figure 26:
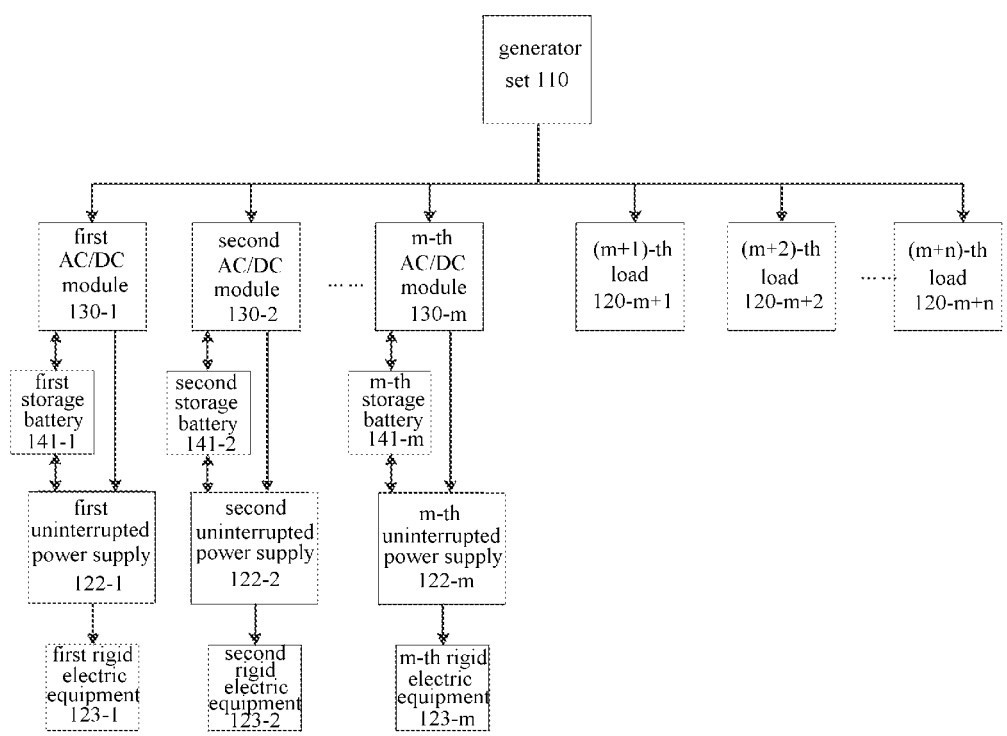
FIG. 26 shows a block diagram of a part of modules of a flexible power supply system according to a seventeenth embodiment of the present disclosure.

In the flexible power supply system according to the present disclosure, the storage battery may be coupled in multiple ways. Reference is made to FIG. 24 which shows a block diagram of a part of modules of a flexible power supply system according to a fifteenth embodiment of the present disclosure. In the flexible power supply system according to the embodiment, the storage battery is coupled to a corresponding AC/DC module to charge and discharge. Reference is made to FIG. 25 which shows a block diagram of a part of modules of a flexible power supply system according to a sixteenth embodiment of the present disclosure. In the flexible power supply system according to the embodiment, the storage battery is coupled to an output bus of a corresponding AC/DC module to charge and discharge. Reference is made to FIG. 26 which shows a block diagram of a part of modules of a flexible power supply system according to a seventeenth embodiment of the present disclosure. In the flexible power supply system according to the embodiment, the storage battery is coupled to a corresponding AC/DC module to charge and discharge, and the storage battery may also be coupled to the uninterrupted power supply to charge and discharge. Specifically, in the present disclosure, a charge and discharge mode of the storage battery may be controlled by controlling an input current of the AC/DC module and an input current of a load connected to the AC/DC module. When the input current of the AC/DC module is not less than the input current of the load, the storage battery enters a charge mode; and when the input current of the AC/DC module is less than the input current of the load, the battery storage enters a discharge mode.

The power supply system according to the embodiment of the present disclosure may be implemented by computer programs. It should be understood by those skilled in the art that the dividing way of modules described above is only one of multiple dividing ways of the modules. The power supply system may be divided into other modules or not divided, as long as the power supply system has the functions described above, and the power supply system also falls within the scope of protection of the present disclosure.

The present disclosure is described with reference to the flowcharts and/or block diagrams of the method, the device (the system) and the computer program product according to the embodiment of the present disclosure. It should be understood that each flow and/or block of the flowcharts and/or block diagrams and a combination of flows and/or blocks in the flowcharts and/or block diagrams may be implemented by computer program instructions. The computer program instructions may be provided to a general-purpose computer, a dedicated computer, an embedded processing device or a processor of other programmable data processing devices to generate a machine, such that the instructions executed by the computer or the processor of other programmable data processing devices generate an apparatus for implementing functions specified in one or more flows of the flowcharts and/or one or more blocks of the block diagram.

The computer program instructions may also be stored in a computer readable memory which can guide the computer or other programmable data processing device to work in a specific way, such that the instructions stored in the computer readable memory generate a product including an instruction apparatus, and the instruction apparatus implements functions specified in one or more flows of the flowcharts and/or one or more blocks of the block diagrams.

The computer program instructions may also be loaded to a computer or other programmable data processing devices, such that the computer or other programmable devices performs a series of operation steps to generate processing implemented by the computer, and thus the instructions performed by the computer or other programmable devices provide steps for implementing functions specified in one or more flows of the flowcharts or one or more blocks of the block diagram.

Obviously, those skilled in the art may make various change and variation to the present disclosure without departing from the spirit and scope of the present disclosure. In this way, if the changes and variations of the present disclosure fall within the scope of claims of the present disclosure and equivalent technology thereof, the present disclosure is intended to include the changes and variations.

The invention claimed is:

1. A power supply system comprising a power grid input unit, an oil engine input unit, an automatic transfer switch unit, a power supply unit and a control unit, wherein the power grid input unit is configured to provide a power grid alternating current interface connecting a power grid alternating current signal and is connected to the automatic transfer switch unit;

the oil engine input unit is connected to the automatic transfer switch unit and is configured to output an alternating current signal using an oil engine;

the automatic transfer switch unit is connected to the control unit and the power supply unit, and is configured to, in response to an instruction of the control unit, connect the power grid input unit to the power supply unit so as to input the alternating current signal from a power grid to the power supply unit, when an alternating current is outputted normally by the power grid alternating current interface; and disconnect the power grid input unit from the power supply unit, connect the oil engine input unit to the power supply unit so as to provide the alternating current signal outputted by the oil engine input unit to the power supply unit, when the alternating current is outputted abnormally by the power grid alternating current interface;

the power supply unit is configured to convert the received alternating current signal into a direct current signal, and supply power to current loads using the direct current signal;

the control unit is configured to monitor a state of the power grid alternating current interface; transmit a first instruction to the automatic transfer switch unit when it is monitored that an alternating current is outputted by the power grid alternating current interface, wherein the first instruction is used for instructing the automatic transfer switch unit to connect the power grid input unit to the power supply unit; transmit a second instruction to the automatic transfer switch unit when it is monitored that no alternating current is outputted by the power grid alternating current interface, wherein the second instruction is used for instructing the automatic transfer switch unit to disconnect the power grid input unit from the power supply unit and connect the oil engine input unit to the power supply unit; monitor currents and voltages of the current loads and a power of a current oil engine; and determine to turn off the predetermined number of current loads based on a magnitude relationship between the power of the current oil engine and power of the current loads, and priority levels of the current loads; and the power supply system further comprises a battery pack unit, wherein the power supply unit is further configured to provide the direct current signal to the battery pack unit;

the control unit is further configured to instruct the power supply unit to control the battery pack unit to supply power to the current loads; and the battery pack unit is configured to supply power to the current loads under control of the power supply unit, and wherein the power supply unit comprises a rectification module and a DC/DC module, wherein the rectification module is configured to convert the received alternating current signal into a direct current signal, and output the direct current signal to the DC/DC module; and the DC/DC module is configured to perform high frequency isolation on the direct current signal inputted by the rectification module, and adjust an output voltage value so as to output to the battery pack unit and the current loads, and wherein the control unit is further configured to detect a current of the battery pack unit, and instruct the DC/DC module to perform high frequency negative pulse discharging on the battery pack unit when the detected current of the battery pack unit is not greater than a preset current value.

2. The system according to claim 1, wherein the DC/DC module is configured to control a switch circuit connected in parallel with the battery pack unit to perform high frequency negative pulse discharging on the battery pack unit after the reception of the instruction transmitted by the control unit for performing high frequency negative pulse discharging on the battery pack unit.

3. The system according to claim 1, wherein the control unit is configured to, in a case that the power of the current oil engine is greater than that of the current loads, prohibit turning off the current loads and instruct the power supply unit to supply power to the battery pack unit and the current loads; in a case that the power of the current oil engine is not greater than that of the current loads, turn off a first number of current loads starting from the load with a low priority according to an ascending order of priorities of the current loads; and in a case that the loads with priority levels less than a preset level each are turned off and the power of the current oil engine is not greater than that of the current loads, instruct the DC/DC module to control the battery pack unit to supply power to the current loads.

4. The system according to claim 1, wherein the automatic transfer switch unit is multiple single-pole double-throw switches.

5. The system according to claim 1, the system further comprising: a storage battery and an alternating current electric equipment group, wherein power is supplied to the alternating current electric equipment group by the power grid alternating current signal when the alternating current is outputted normally by the power grid alternating current interface, an oil engine begins to start when the alternating current is outputted abnormally by the power grid alternating current interface, and power is supplied to the alternating current electric equipment group by the storage battery before the oil engine is started, characterized in that, the system further comprises:

an AC/DC converting module configured to convert the alternating current of the oil engine into a direct current and output the direct current to the storage battery after the oil is started, wherein power is supplied to the alternating current electric equipment group by the AC/DC converting module in combination with the storage battery when a total power requirement of all loads operating currently in the alternating current electric equipment group is greater than an instantaneous power of the oil engine; and power is supplied to the alternating current electric equipment group by the AC/DC converting module and the AC/DC converting module charges the storage battery when the total power requirement of all loads operating currently in the alternating current electric equipment group is not greater than the instantaneous power of the oil engine.

6. The system according to claim 5, the system further comprising:

a reactive power compensation module connected to an output terminal of the oil engine and configured to adjust a power factor of a load of the oil engine when the oil engine operates, such that the load of the oil engine presents resistive or weak inductive.

7. The system according to claim 5, the system further comprising:

a harmonic compensation module connected to an output terminal of the oil engine and configured to handle harmonics in a circuit when the oil engine operates.

8. The system according to claim 5, the system further comprising:

a reactive power harmonic compensation module connected to an output terminal of the oil engine and configured to handle harmonics in a circuit and adjust a power factor of a load of the oil engine when the oil engine operates, such that the load of the oil engine presents resistive or weak inductive.

9. The system according to claim 5, wherein, the alternating current electric equipment group comprises a main input terminal, a direct current input terminal and a bypass input terminal.

10. The system according to claim 9, wherein, the power grid alternating current signal is connected to the main input terminal of the alternating current electric equipment group so as to function as a main power supply, and the direct current input terminal of the alternating current electric equipment group is connected to the AC/DC converting module and the storage battery.

11. The system according to claim 10, wherein, the oil engine is connected to the bypass input terminal of the alternating current electric equipment group so as to function as a bypass power supply.

12. The system according to claim 10, the system further comprising an ATS switching module connected to the bypass input terminal of the alternating current electric equipment group, wherein the ATS switching module is configured to, when the alternating current is outputted normally by the power grid alternating current interface, input the power grid alternating current signal to the bypass input terminal of the alternating current electric equipment group so as to function as a bypass power supply; and when the alternating current is outputted abnormally by the power grid alternating current interface, connect the oil engine to the bypass input terminal of the alternating current electric equipment group so as to function as the bypass power supply.

13. The system according to claim 5, wherein, the oil engine is a diesel generator or a gasoline generator.

14. The system according to claim 1, the system further comprising the oil engine, a plurality of loads and at least one storage battery pack, wherein power is supplied to the plurality of loads by an oil engine when the alternating current is outputted abnormally by the power grid alternating current interface;
the power supply unit is an AC/DC device when the alternating current is outputted abnormally by the power grid alternating current interface;
the AC/DC device comprises:
at least one AC/DC module configured correspondingly to the at least one storage battery pack and at least one of the plurality of loads, wherein each of the at least one AC/DC module is configured to convert the alternating current outputted by the oil engine into a direct current and supply power to a corresponding load in combination with the at least one storage battery pack; and
a monitoring module connected to the at least one AC/DC module and configured to detect a total output current of the oil engine and transmit an instruction according to the total output current of the oil engine to control an input power of the at least one AC/DC module, such that a total output power of the oil engine is not greater than a preset power.

15. The system according to claim 14, wherein, the monitoring module is configured to detect the total output current of the oil engine when the system starts, transmit an instruction to start the at least one AC/DC module in a case that the total output current is less than a set value; and continue to detect the total output current and determine whether the total output current is less than the set value in a case that the total output current is not less than the set value.

16. The system according to claim 15, wherein, the monitoring module is further configured to, after transmitting the instruction to start the at least one AC/DC module, control the at least one AC/DC module such that the total output current of the oil engine increases gradually and continuously detect whether the total output current of the oil engine is less than the set value; transmit an instruction to the at least one AC/DC module to gradually increase an input power of the at least one AC/DC module such that the total output current of the oil engine increases, if the total output current is less than the set value; and transmit an instruction to the at least one AC/DC module to gradually decrease the input power of the at least one AC/DC module such that the total output current of the oil engine decreases, if the total output current is not less than the set value.

17. The system according to claim 16, wherein, the monitoring module is configured to, after transmitting the instruction to start the at least one AC/DC module, detect remaining electric quantities of the at least one storage battery pack, rank for the remaining electric quantities of the at least one storage battery pack in an ascending order, select one or more storage battery packs with the lowest remaining electric quantity, and increase an input power of an AC/DC module connected to the one or more storage battery packs.

18. The system according to claim 16, wherein, the monitoring module is configured to, after transmitting the instruction to start the at least one AC/DC module, allocate an input power according to priorities of loads connected to respective AC/DC modules among the at least one AC/DC module.

19. The system according to claim 14, wherein, the at least one AC/DC module comprises:
an AC/DC converting unit configured to convert an alternating current outputted by the oil engine into a direct current;
an electric quantity calculating unit configured to detect a remaining electric quantity of a storage battery pack connected to the electric quantity calculating unit and transmit the detected remaining electric quantity to the monitoring module; and
a charging control unit configured to control charging and discharging of a storage battery pack connected to the charging control unit.

20. The system according to claim 19, wherein, the at least one AC/DC module further comprises a battery life calculating unit configured to calculate a battery life of a storage battery pack connected to the battery life calculating unit and transmit the calculated battery life to the monitoring module.

21. The system according to claim 19, wherein, a maximum instantaneous input power is not greater than k multiples of the output load when the at least one AC/DC module outputs a shock load, where $1<k<3$.

22. The system according to claim 19, wherein, after the system is turned off due to an abnormal input voltage, the at least one AC/DC module automatically starts and recovers to supply power when the input voltage returns to normal.

23. The system according to claim 1, wherein, the system is a flexible power supply system and further comprises an oil engine and a plurality of loads; power is supplied to the plurality of loads by the oil engine when the alternating current is outputted abnormally by the power grid alternating current interface; the plurality of loads comprise a first load group and a second load group; the system further comprises an AC/DC module and an energy storage module provided correspondingly for each load in the second load group; and the AC/DC module is configured to convert the alternating current outputted by the oil engine into a direct current, and
the system further comprises a control module configured to: in a case that a total output power of the oil engine is determined to reach a preset power, control the AC/DC module in the second load group to supply power to a corresponding load in combination with the energy storage module, so as to control the total output power of the oil engine not to be higher than a rated power; and in a case that the total output power of the oil engine is determined to be less than the preset power, increase an input power of the second load group, so as to control the AC/DC module to supply power to a corresponding load and store energy to the energy storage module simultaneously.

24. The system according to claim 23, wherein, the control module is configured to determine an output power of the oil engine by detecting the total output current of the oil engine; determine that the output power of the oil engine reaches the preset power in a case that the total output current reaches a preset current; and determine that the output power of the oil engine is less than the preset power in a case that the total output current is less than the preset current.

25. The system according to claim 23, wherein, the energy storage module is a storage battery.

26. The system according to claim 25, wherein, loads in the second load group are an uninterruptible power supply and a rigid electric equipment connected to the uninterruptible power supply.

27. The system according to claim 26, wherein, the uninterruptible power supply comprises a main input terminal, a bypass input terminal and a direct current input terminal.

28. The system according to claim 27, wherein, the bypass input terminal of the uninterruptible power supply is coupled to the output terminal of the oil engine via a first switch.

29. The system according to claim 27, wherein, the main input terminal of the uninterrupted power supply is coupled to the power grid alternating current interface via a second switch.

30. The system according to claim 27, wherein, the main input terminal is a three-phase, bi-phase or a single phase system, and the bypass input terminal is a three-phase, bi-phase or a single phase system.

31. The system according to claim 26, wherein, the storage battery is coupled to a corresponding AC/DC module to charge and discharge; or the storage battery is coupled to an output bus of a corresponding AC/DC module to charge and discharge.

32. The system according to claim 26, wherein, the storage battery is coupled to the AC/DC module to charge and discharge, and the storage battery is coupled to the uninterrupted power supply to charge and discharge.

33. A power supply method, comprising:
converting an alternating current provided by an oil engine into a direct current when the oil engine starts to supply power;
monitoring a current of current loads and a power of a current oil engine;
supplying power to a battery pack and the current loads using the direct current in a case that the power of the current oil engine is greater than that of the current loads;
turning off a first number of loads to be supplied power starting from the load to be supplied power with a low priority according to an ascending order of priorities of the current loads, in a case that the power of the current oil engine is not greater than that of the current loads;
controlling the battery pack to supply power to the current loads after the loads to be supplied power having a priority lower than a preset level each are turned off and the power of the current oil engine is not greater than that of the current loads;
detecting a current of the battery pack; and
controlling a switch circuit connected in parallel with the battery pack to perform negative pulse discharging in a case that the detected current of the battery pack is not greater than a preset current value.

34. The power supply method according to claim 33, wherein, before the oil engine starts to supply power, the power supply method further comprises:
monitoring an operation state of a power grid input unit; and
determining whether the power grid input unit stops supplying power.

35. The power supply method according to claim 33, which is applicable to a power supply system, wherein the power supply system comprises the oil engine, a plurality of loads to which power is supplied by the oil engine, and at least one storage battery pack and at least one AC/DC module provided correspondingly for at least one of the plurality of loads, and wherein each of the at least one AC/DC module is configured to convert an alternating current outputted by the oil engine into a direct current and supply power to a corresponding load in combination with the at least one storage battery pack; and
the power supply method further comprises a control method,
the control method comprises: detecting a total output current of the oil engine and transmitting an instruction, according to the total output current of the oil engine, to control an input power of the at least one AC/DC module, such that a total output power of the oil engine is not greater than a preset power.

36. The power supply method according to claim 35, wherein, the control method further comprises:
detecting the total output current of the oil engine when the system starts; transmitting an instruction to start the at least one AC/DC module in a case that the total output current is less than a set value; and continuously detecting the total output current and determining whether the total output current is less than the set value, in a case that the total output current is not less than the set value.

37. The power supply method according to claim 36, wherein, the control method further comprises:
after the transmitting an instruction to start the at least one AC/DC module, controlling the at least one AC/DC module such that the total output current of the oil engine gradually increases and continuously detecting whether the total output current of the oil engine is less than the set value; in a case that the total output current is less than the set value, transmitting an instruction to the at least one AC/DC module to gradually increase an input power of the at least one AC/DC module, such that the total output current of the oil engine increases; and in a case that the total output current of the oil engine is not less than the set value, transmitting an instruction to the at least one AC/DC module to gradually decrease the input power of the at least one AC/DC module, such that the total output current of the oil engine decreases.

38. The power supply method according to claim 37, wherein, the control method further comprises: after the transmitting an instruction to start the at least one AC/DC module, detecting remaining electric quantities of the at least one storage battery pack, ranking for the remaining electric quantities of the at least one storage battery pack in an ascending order, selecting one or more storage battery packs with the lowest remaining electric quantity, and increasing an input power of an AC/DC module connected to the one or more storage battery packs.

39. The power supply method according to claim 37, wherein, the control method comprises: after transmitting an instruction to start the at least one AC/DC module, allocating an input power according priorities of loads connected to respective AC/DC modules among the at least one AC/DC module.

* * * * *